US010330191B2

(12) United States Patent
Neumann et al.

(10) Patent No.: US 10,330,191 B2
(45) Date of Patent: Jun. 25, 2019

(54) DOUBLE DISCONNECT TRANSMISSION REVERSER WITH DISCONNECT SYNCHRONIZER

(71) Applicant: Deere & Company, Moline, IL (US)

(72) Inventors: Clayton P. Neumann, Cedar Falls, IA (US); Mehawesh Alkhalil, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/496,509

(22) Filed: Apr. 25, 2017

(65) Prior Publication Data

US 2017/0241543 A1 Aug. 24, 2017

Related U.S. Application Data

(63) Continuation-in-part of application No. 15/049,629, filed on Feb. 22, 2016, now Pat. No. 10,197,133.

(51) Int. Cl.
*F16H 61/04* (2006.01)
*F16H 61/08* (2006.01)
(Continued)

(52) U.S. Cl.
CPC ..... *F16H 61/0246* (2013.01); *F16H 61/0403* (2013.01); *F16H 61/08* (2013.01);
(Continued)

(58) Field of Classification Search
CPC ...... F16H 61/08; F16H 61/70; F16H 61/0246; F16H 61/0403; F16H 63/302;
(Continued)

(56) References Cited

U.S. PATENT DOCUMENTS 3,437,184 A 4/1969 Wilson
4,768,636 A * 9/1988 Ito ................... B60W 10/02
192/222
(Continued)

FOREIGN PATENT DOCUMENTS

DE 102012207976 A1 11/2013
EP 0004045 A1 9/1979

OTHER PUBLICATIONS

Schaeffler Symposium, AWD Disconnect—Escaping the Clutches of the Dog, PowerPoint, 2014.
(Continued)

*Primary Examiner* — Charles A Fox
*Assistant Examiner* — Tinh T Dang
(74) *Attorney, Agent, or Firm* — Klintworth & Rozenblat IP LLP

(57) ABSTRACT

A control system for a transmission reverser having an output gear, a forward disconnect device, a first reverse disconnect device, and a second reverse disconnect device includes one or more controllers with processing and memory architecture configured to execute control logic to control the transmission reverser in a forward mode and a reverse mode. In the forward mode, the one or more controllers command the first reverse disconnect device to disengage and the forward disconnect device to engage to rotate the output gear in a forward direction. In the reverse mode, the one or more controllers command the first reverse disconnect device to engage and the second reverse disconnect device to engage to rotate the output gear in a reverse direction.

15 Claims, 19 Drawing Sheets

(51) Int. Cl.
*F16H 61/70* (2006.01)
*F16H 63/30* (2006.01)
*F16H 59/46* (2006.01)
*F16H 61/02* (2006.01)
*F16H 59/38* (2006.01)

(52) U.S. Cl.
CPC ........... *F16H 61/70* (2013.01); *F16H 63/302* (2013.01); *F16H 59/38* (2013.01); *F16H 59/46* (2013.01); *F16H 2059/462* (2013.01); *F16H 2059/465* (2013.01); *F16H 2306/48* (2013.01)

(58) Field of Classification Search
CPC .... F16H 59/38; F16H 59/46; F16H 2059/462; F16H 2059/465; F16H 2306/48
See application file for complete search history.

(56) References Cited

U.S. PATENT DOCUMENTS

| | | | | |
|---|---|---|---|---|
| 4,848,529 | A * | 7/1989 | Kurihara | B60W 30/18 477/78 |
| 5,046,592 | A * | 9/1991 | Mainquist | F16H 61/0246 192/3.57 |
| 5,125,282 | A | 6/1992 | Bender et al. | |
| 5,280,731 | A | 1/1994 | Turpin | |
| 5,408,896 | A | 4/1995 | Vogt | |
| 6,237,738 | B1 | 5/2001 | Chow | |
| 6,345,548 | B1 * | 2/2002 | Ohashi | F16H 61/12 477/906 |
| 6,439,073 | B2 * | 8/2002 | Ohashi | F16H 59/0204 74/335 |
| 7,703,353 | B2 | 4/2010 | Janson | |
| 7,771,314 | B2 * | 8/2010 | Eguchi | B60T 7/02 477/109 |
| 7,918,757 | B2 | 4/2011 | Janson | |
| 7,946,953 | B2 * | 5/2011 | Koga | F16H 61/0213 477/78 |
| 8,001,862 | B2 | 8/2011 | Albulushi et al. | |
| 8,757,021 | B2 | 6/2014 | Singh et al. | |
| 2008/0302195 | A1 | 12/2008 | McCord | |
| 2013/0133450 | A1 | 5/2013 | Hedman | |
| 2015/0031491 | A1 | 1/2015 | Otten et al. | |
| 2015/0114154 | A1 | 4/2015 | Terasawa | |
| 2015/0367728 | A1 | 12/2015 | Neumann | |

OTHER PUBLICATIONS

USPTO, Office Action in U.S. Appl. No. 15/049,629 dated Feb. 15, 2018.

German search report for patent application No. 10 2017 202 764.9 dated Nov. 19, 2018.

* cited by examiner

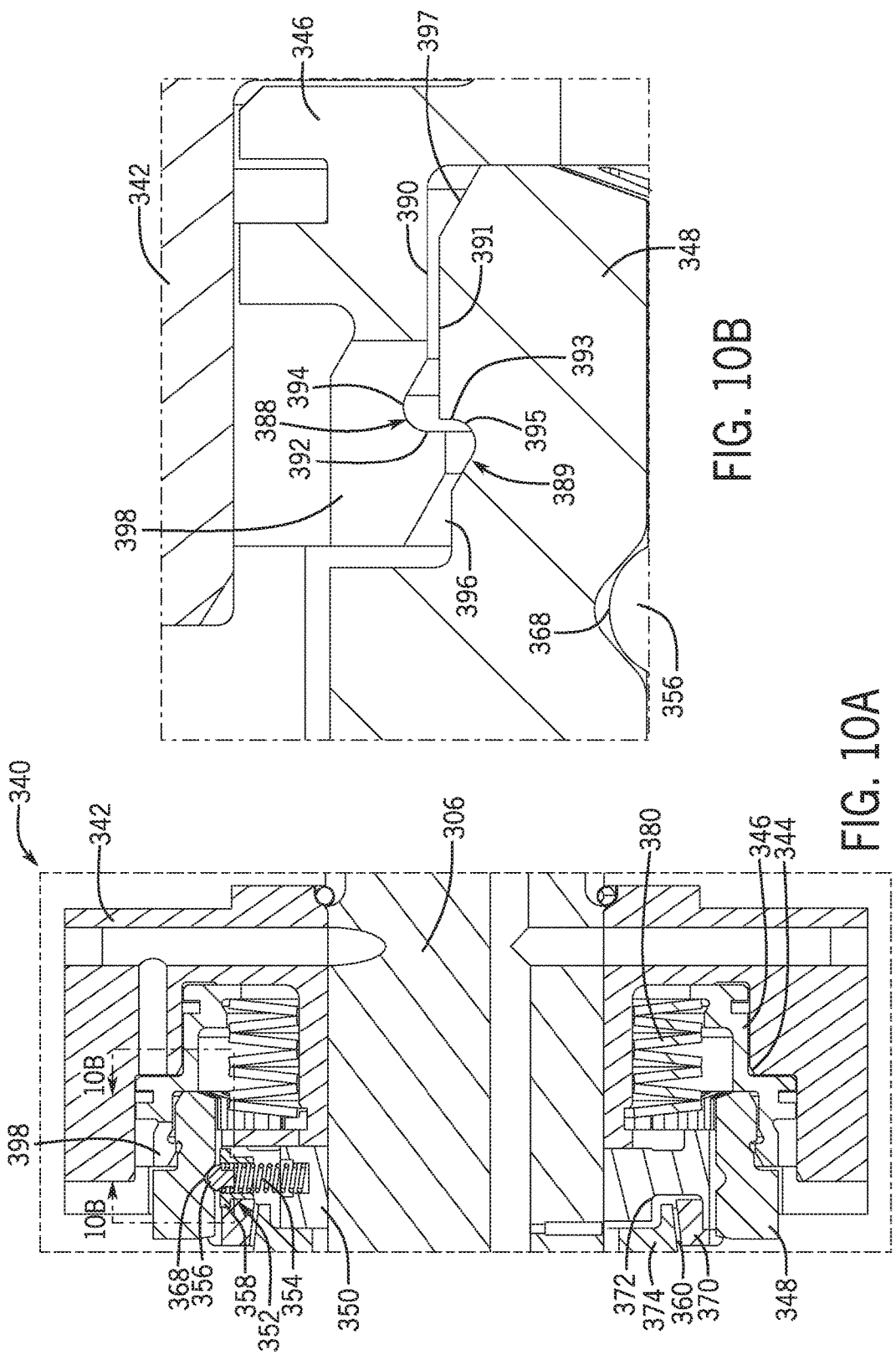

DOUBLE DISCONNECT TRANSMISSION REVERSER WITH DISCONNECT SYNCHRONIZER

CROSS-REFERENCE TO RELATED APPLICATION(S)

This is a continuation-in-part application of pending application Ser. No. 15/049,629, filed Feb. 22, 2016.

STATEMENT OF FEDERALLY SPONSORED RESEARCH OR DEVELOPMENT

Not applicable.

FIELD OF THE DISCLOSURE

The present disclosure relates generally to transmissions having a reverser for changing the direction of a vehicle.

BACKGROUND OF THE DISCLOSURE

Transmissions are used in vehicles or work machines such as, agricultural, construction, off-road, and industrial machines, for example. Transmissions used in work machines typically provide a large number of gear ratios for propelling the vehicle. A transmission may include a reverser for changing directions of the vehicle. The reverser can be located near the output of the transmission. In some prior designs, a countershaft reverser rotates at high speeds when the vehicle is operating at high forward speeds. This can cause high windage in the reverse clutch. This can also cause gyroscopic flutter, in which the friction disk or the separator plate becomes dynamically unstable creating drag in the clutch. This drag can cause the disengaged clutch to experience a thermal failure. In other prior designs, a synchronized reverser goes to neutral when switching between forward and reverse causing a pause in the acceleration.

SUMMARY OF THE DISCLOSURE

This summary is provided to introduce a selection of concepts that are further described below in the detailed description and accompanying drawings. This summary is not intended to identify key or essential features of the appended claims, nor is it intended to be used as an aid in determining the scope of the appended claims.

According to an aspect of the present disclosure, a control system for a transmission reverser having an output gear, a forward disconnect device, a first reverse disconnect device, and a second reverse disconnect device includes one or more controllers with processing and memory architecture configured to execute control logic to control the transmission reverser in a forward mode and a reverse mode. In the forward mode, the one or more controllers command the first reverse disconnect device to disengage and the forward disconnect device to engage to rotate the output gear in a forward direction. In the reverse mode, the one or more controllers command the first reverse disconnect device to engage and the second reverse disconnect device to engage to rotate the output gear in a reverse direction.

According to another aspect of the present disclosure, a control system for a transmission reverser having an output shaft, an output gear, a reverse gear, a forward clutch, a reverse clutch, and a reverse disconnect synchronizer includes one or more controllers having processing and memory architecture configured to execute control logic to control the transmission reverser in a forward mode and a reverse mode. One or more sensors detect a speed of one or more components of the transmission reverser. In the forward mode, the one or more controllers command the reverse clutch to disengage, command the forward clutch to engage to connect to the output gear to the output shaft such that the output gear rotates in a direction of rotation of the output shaft. The one or more controllers also receive and analyze a speed input from the one or more sensors, and command the reverse disconnect synchronizer to engage or disengage depending upon the speed input such that the reverse clutch is either connected to the output gear or disconnected from the output gear. In the reverse mode, the one or more controllers command the reverse clutch and the reverse disconnect synchronizer to engage such that the reverse shaft rotates the output gear in a reverse direction of rotation opposite the direction of rotation of the output shaft.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIG. 10A is an enlarged view of an example disconnect synchronizer arrangement for a reverser, according to the second embodiment;

FIG. 10B is a detailed view of area 10B-10B of an interface between an actuator piston and a shift collar of the disconnect synchronizer shown in FIG. 10A;

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
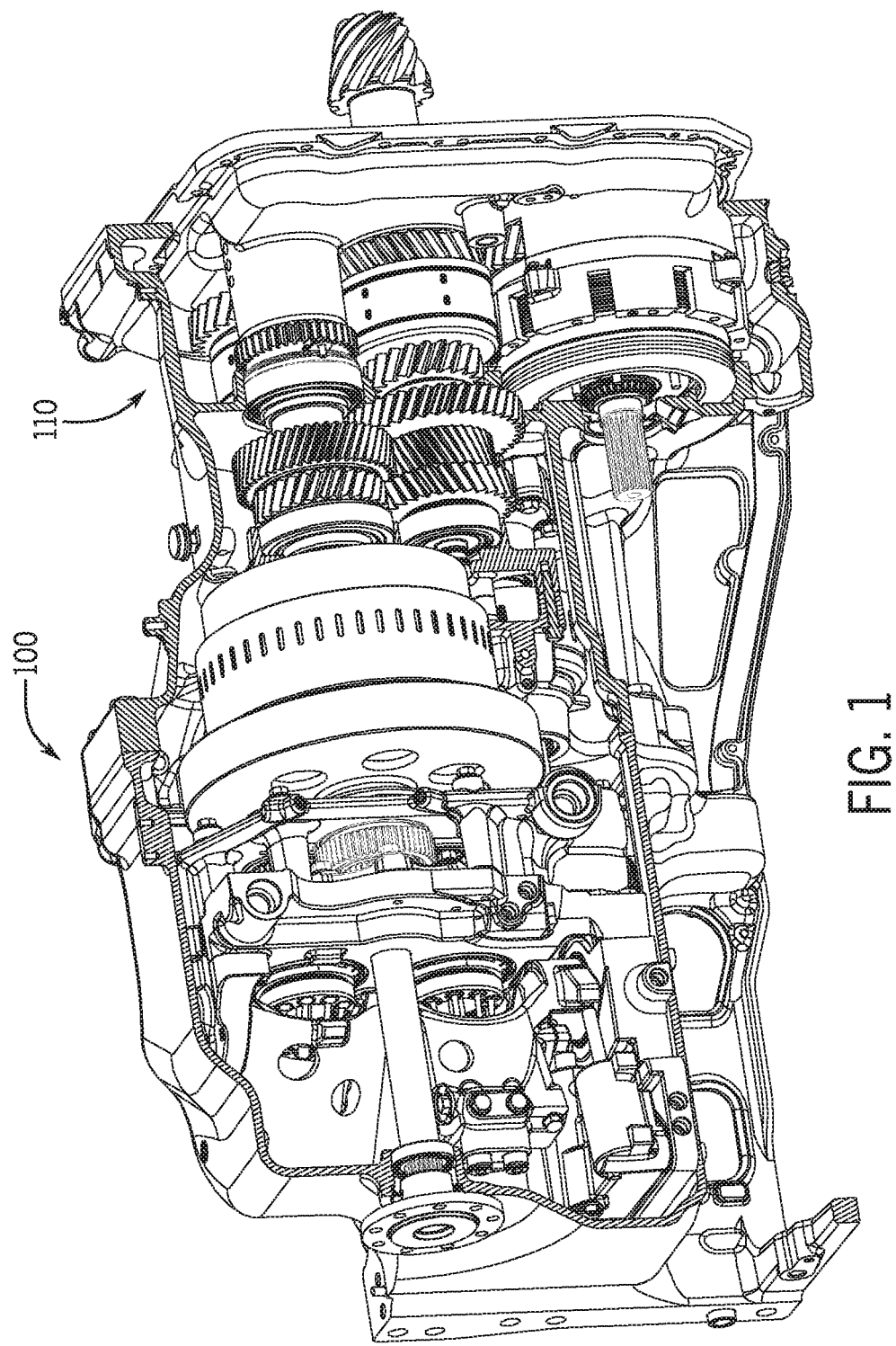
FIG. 1 is a perspective cutaway view of a transmission, according to one embodiment.

FIG. 1 illustrates a transmission 100 for a vehicle or work machine, such as a tractor, for example. The present disclosure also applies to other powered or motorized vehicles, machines, or equipment. The transmission 100 includes a housing 102 forming an interior, which provides an enclosure for one or more transmission components including, but not limited to, shafts, gears, clutches, and synchronizers. The transmission 100 may include a transmission reverser apparatus 110, which shifts the transmission output between forward and reverse. The reverser 110 can be integral with or separate from the transmission 100.

Figure 2:
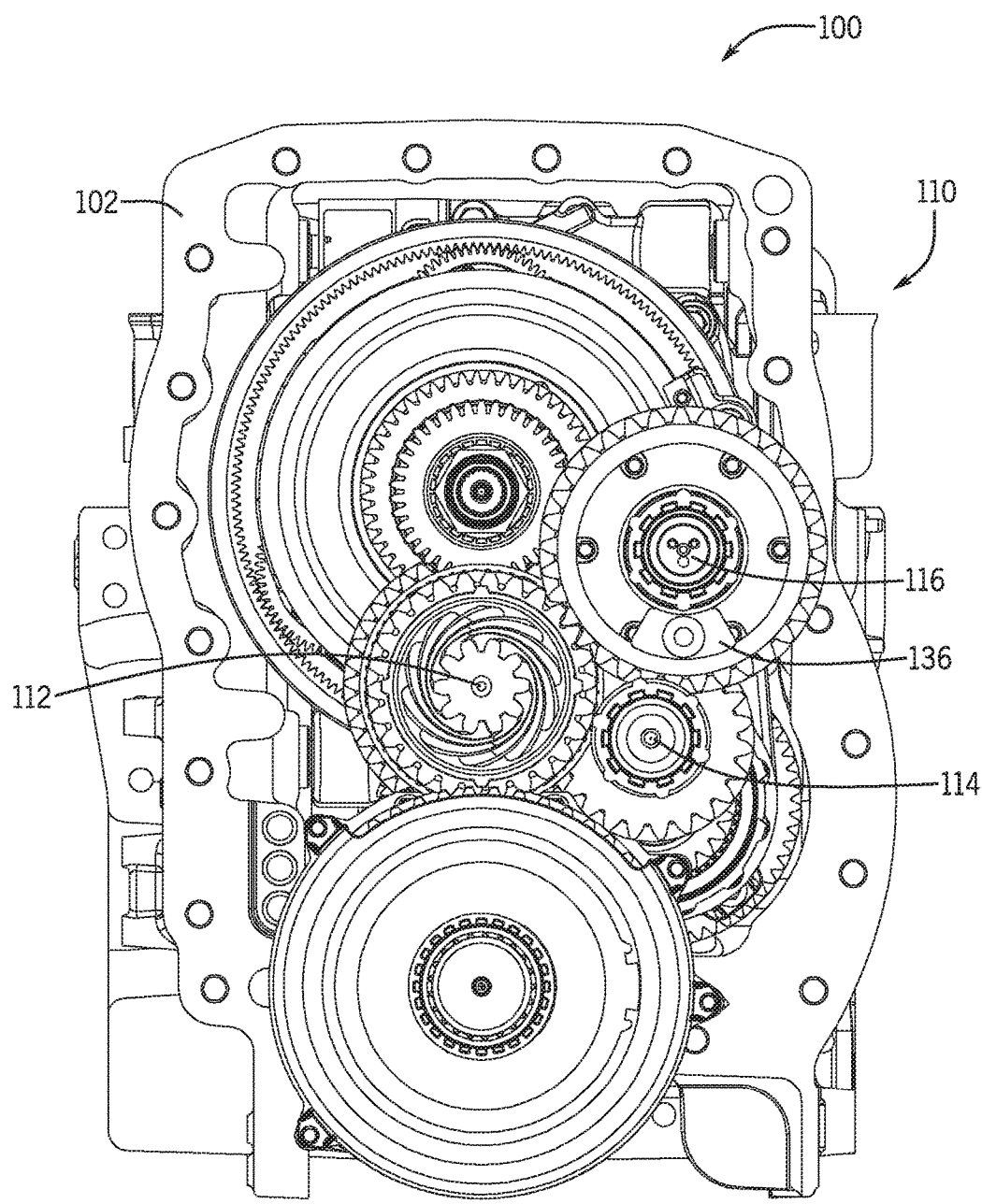
FIG. 2 is a rear perspective view of a transmission, according to one embodiment.
Figure 3:
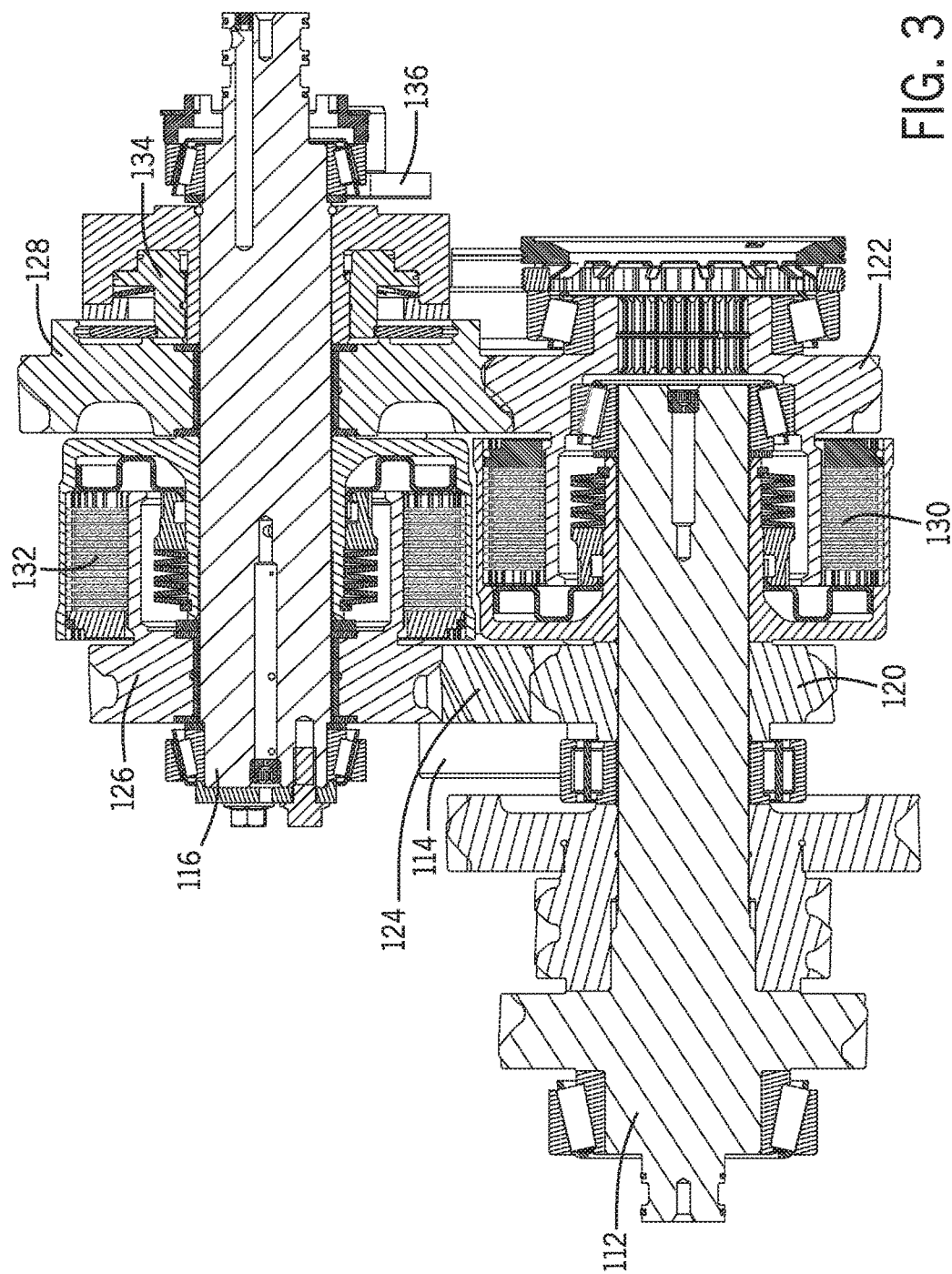
FIG. 3 is a side sectional view of a reverser, according to one embodiment.

FIGS. 2 and 3 illustrate a transmission 100 having a reverser apparatus 110, which may include one or more of the following components. The transmission 100 may include an output shaft 112, an idler shaft 114, and a counter shaft 116 rotatably connected to the transmission housing 102. The transmission 100 may include a first reverse gear 120 and an output gear 122 positioned or mounted on the output shaft 112. The output gear 122 is operatively connected to the drivetrain of a vehicle providing power to ground engaging apparatus such as wheels or tracks. The transmission may include an idler gear 124 positioned or mounted on the idler shaft 114. The transmission may include a second reverse gear 126 and a third reverse gear 128 positioned or mounted on the counter shaft 116. The transmission 100 may include a forward clutch 130, which operably connects or couples the output gear 122 with the output shaft 112 in an engaged position or condition. The forward clutch 130 may be connected to or mounted about the output shaft 112.

The transmission 100 may include a reverse clutch 132, which operably connects or couples the second reverse gear 126 with the counter shaft 116 in an engaged position or condition. The reverse clutch 132 may be connected to or mounted about the counter shaft 116. In another embodiment, the reverse clutch 132 operably connects or couples the first reverse gear 120 with the output shaft 112. The reverse clutch 132 may be connected to or mounted about the output shaft 112. In this embodiment, the output shaft 112 rotates independently of the first reverse gear 120, the idler gear 124, and idler shaft 114 when the reverse clutch 132 is disengaged. The transmission 100 may include a disconnect clutch 134, which operably connects or couples the third reverse gear 128 with the counter shaft 116 in an engaged position or condition. The disconnect clutch 134 may be connected to or mounted about the counter shaft 116. The first reverse gear 120 engages or meshes with the idler gear 124, which engages or meshes with the second reverse gear 126. The third reverse gear 128 engages or meshes with the output gear 122. The transmission 100 may include a countershaft brake 136, which reduces or stops the rotation of the counter shaft 116 in an engaged position or condition. In some embodiments, the countershaft brake 136 can impede or prevent the counter shaft 116 from rotating. This can impede or prevent the reverse clutch 132 from rotating when the countershaft brake 136 is engaged.

Figure 4:
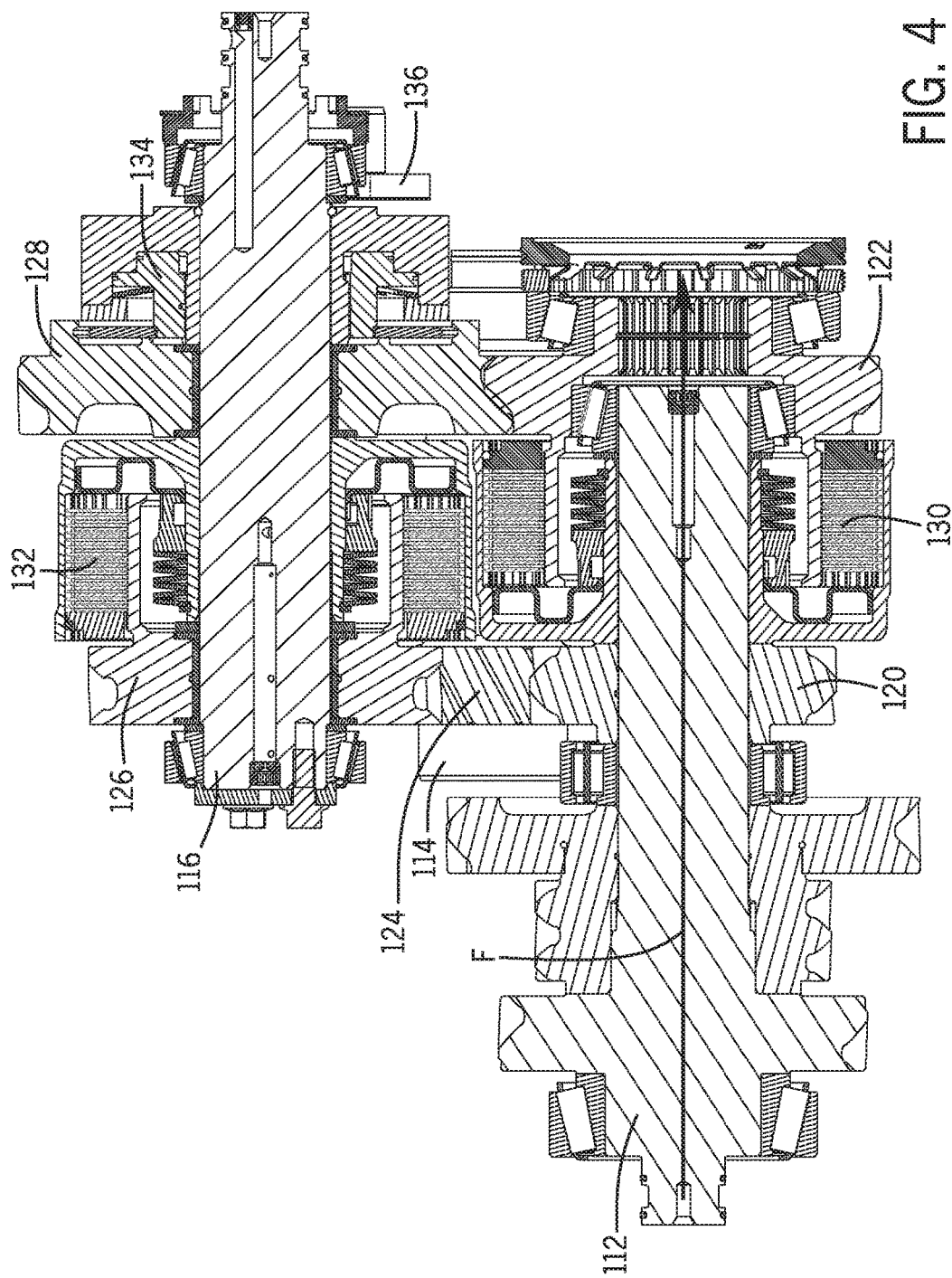
FIG. 4 is a side sectional view of a reverser illustrating the power path for the forward mode, according to one embodiment.

FIG. 4 illustrates a power path or flow for a forward mode F through the reverser apparatus 110. In the forward mode F, the forward clutch 130 is engaged causing the output gear 122 to rotate with the output shaft 112, the countershaft brake 136 is engaged impeding or preventing the counter shaft 116 from rotating, and the reverse clutch 132 and the disconnect clutch 134 are disengaged. When the countershaft brake 136 is engaged, this can also impede or prevent the reverse clutch 132 from rotating. The idler shaft 114 rotates opposite to the output shaft 112 based upon the ratio of the first reverse gear 120 to the idler gear 124. The second reverse gear 126 rotates about the counter shaft 116 in a direction opposite of the idler shaft 114 based upon the ratio of the idler gear 124 to the second reverse gear 126. At slow forward speeds, the countershaft brake 136 can be disengaged and the disconnect clutch 134 can be engaged causing the counter shaft 116 to rotate in the opposite direction as the output shaft 112 based upon the ratio of the output gear 122 to the third reverse gear 128. In some embodiments, slow forward speeds are at or below about 5 kph, 4 kph, 3 kph, 2 kph, or 1 kph.

Figure 5:
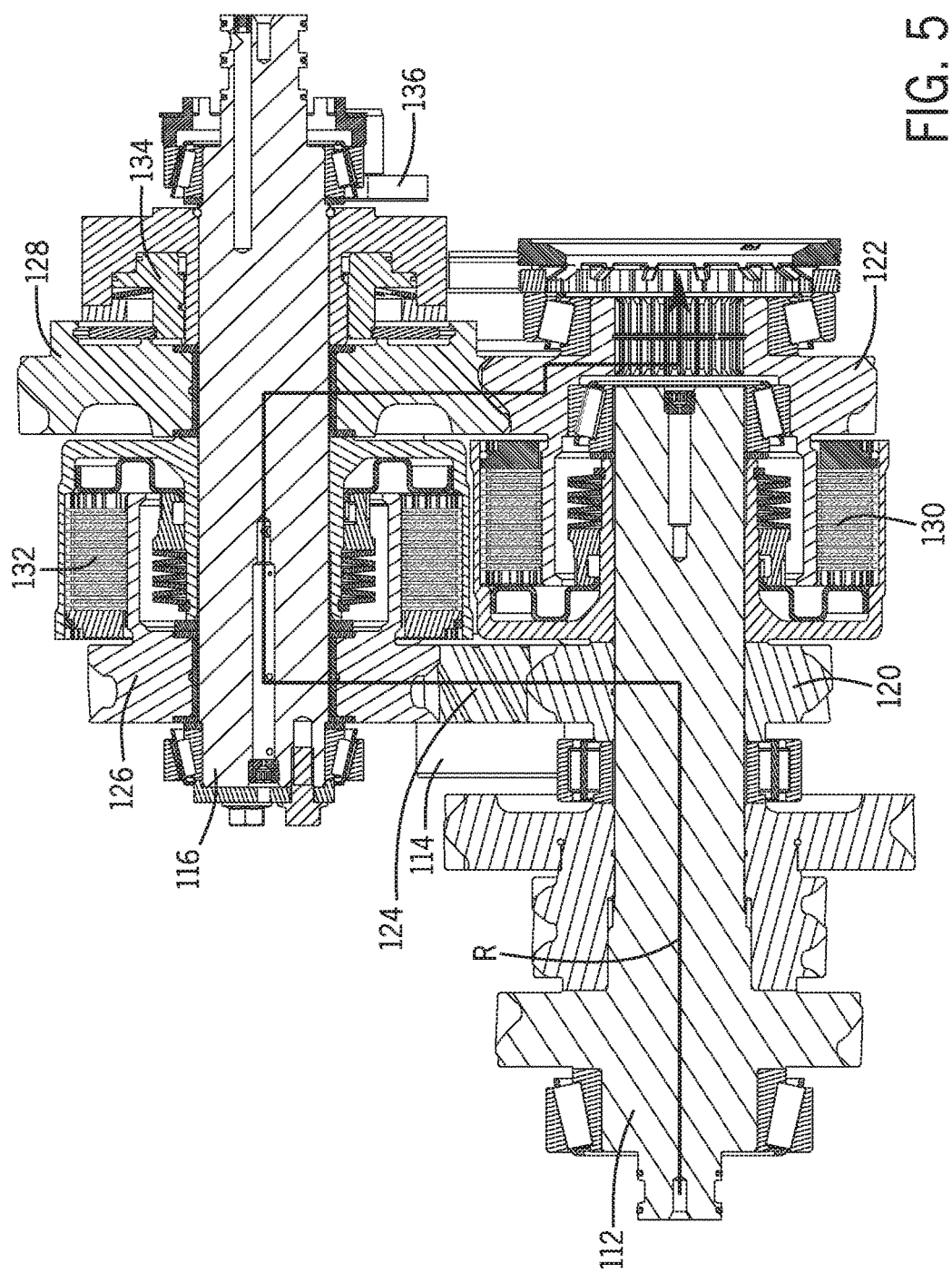
FIG. 5 a side sectional view of a reverser illustrating the power path for the reverse mode, according to one embodiment.

FIG. 5 illustrates a power path or flow for a reverse mode R through the reverser apparatus 110. In the reverse mode R, the reverse clutch 132 and the disconnect clutch 134 are engaged causing the output gear 122 to rotate in a direction opposite the output shaft 112. The forward clutch 130 and the countershaft brake 136 are disengaged. The output gear 122 rotates opposite to the counter shaft 116 based upon the ratio of the third reverse gear 128 to the output gear 122. The counter shaft 116 rotates opposite to the idler shaft 114 based upon the ratio of the idler gear 124 to the second reverse gear 126. The idler shaft 114 rotates opposite the output shaft 112 based upon the ratio of the first reverse gear 120 to the idler gear 124. As a result, the counter shaft 116 rotates in the same direction as the output shaft 112.

Figure 6:
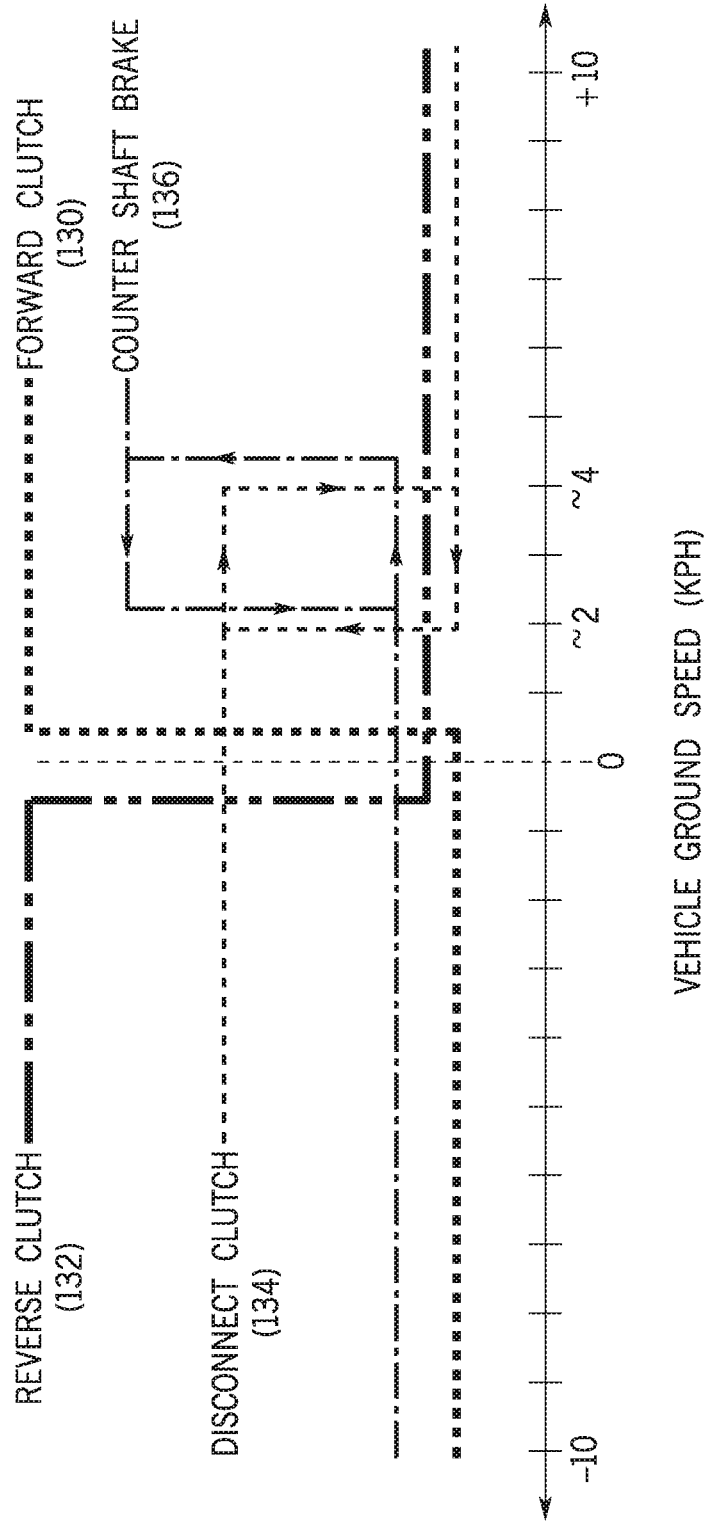
FIG. 6 is a schematic diagram of a control strategy for a transmission, according to one embodiment.

FIG. 6 illustrates a control strategy for a transmission, which may be implemented in one or more of the embodiments described herein and depicted in the various FIGURES. When the transmission is in the reverse mode R, the reverse clutch 132 and the disconnect clutch 134 are engaged and the forward clutch 130 and countershaft brake 136 are disengaged. When switching between the reverse mode R and the forward mode F, events can occur in the following order: the reverse clutch 132 is disengaged, the forward clutch 130 is engaged, the disconnect clutch 134 is disengaged, and the countershaft brake 136 is engaged. The reverse clutch 132 and the forward clutch 130 can be engaged and disengaged at slow reverse speeds, slow forward speeds, or when the vehicle is not moving.

When the transmission is in the forward mode F, the forward clutch 130 and countershaft brake 136 are engaged and the reverse clutch 132 and the disconnect clutch 134 are disengaged. When switching between the forward mode F and the reverse mode R, events can occur in the following order: the countershaft brake 136 is disengaged, the disconnect clutch 134 is engaged, the forward clutch 130 is disengaged, and the reverse clutch is engaged. The disconnect clutch 134 and the countershaft brake 136 can be engaged and disengaged at slow forward speeds or when the vehicle is not moving.

Figure 7:
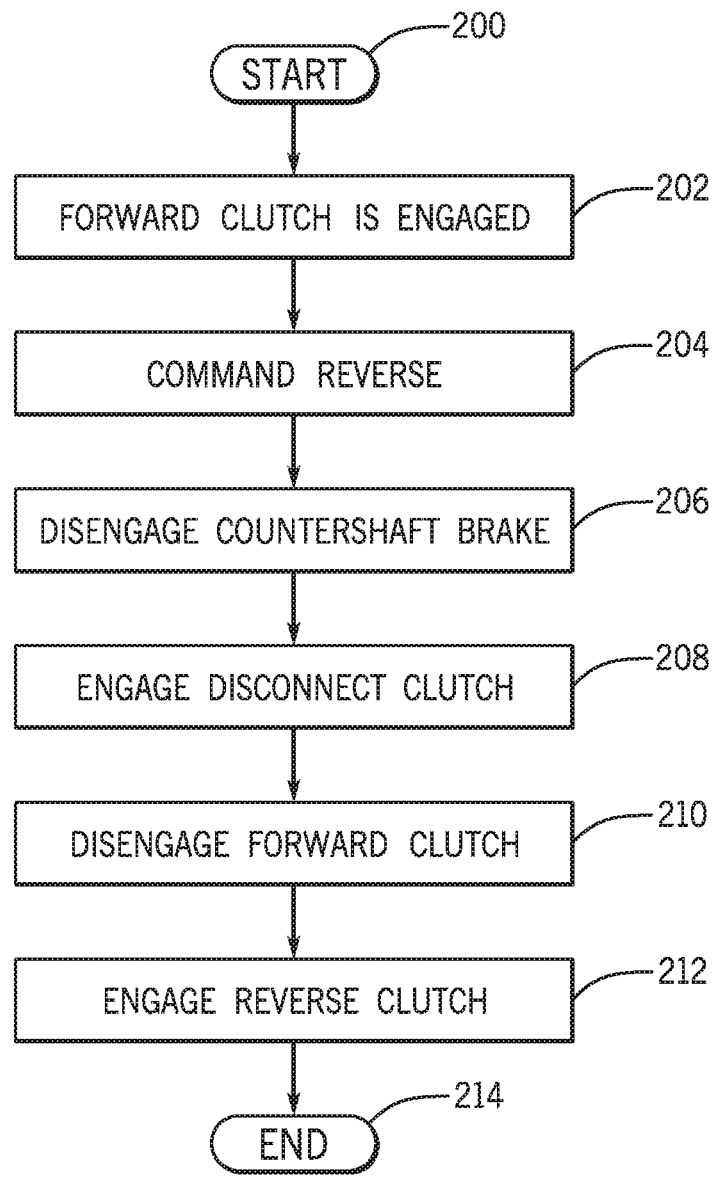
FIG. 7 is a flow diagram illustrating a method of shifting between forward and reverse directions in a transmission reverser, according to one embodiment.

FIG. 7 illustrates a flow chart for a method of shifting between a forward mode and a reverse mode in a transmission reverser, according to one embodiment, which may be implemented in one or more of the embodiments described herein and depicted in the various FIGURES. At step 200, the method starts.

At step 202, the transmission is in the forward mode F with the forward clutch 130 and the countershaft brake 136 in the engaged conditions.

At step 204, the transmission receives a command to switch from the forward mode F to the reverse mode R.

At step 206, the countershaft brake 136 disengages which allows the counter shaft 116 to rotate.

At step 208, the disconnect clutch 134 engages which releasably connects or couples the third reverse gear 128 to the counter shaft 116 causing the counter shaft 116 to rotate in the opposite direction as the output shaft 112 based upon the engagement of the third reverse gear 128 with the output gear 122.

At step 210, the forward clutch 130 disengages which disconnects the output gear 122 from the output shaft 112 allowing the output gear 122 to rotate independently of the output shaft 112.

At step 212, the reverse clutch 132 engages which releasably connects or couples the second reverse gear 126 to the counter shaft 116 causing the counter shaft 116 to rotate in the same direction as the output shaft 112 based upon the engagement of the first reverse gear 120 mounted on the output shaft 112 with an idler gear 124 mounted on an idler shaft 114 and the engagement of the idler gear 124 with the second reverse gear 126.

In an alternate step 212, the reverse clutch 132 engages which releasably connects or couples the first reverse gear 120 to the output shaft 112 causing the counter shaft 116 to rotate in the same direction as the output shaft 112 based upon the engagement of the first reverse gear 120 with the idler gear 124 mounted on the idler shaft 114 and the engagement of the idler gear 124 with the second reverse gear 126 mounted on the counter shaft 116.

At step 214, the method of shifting between a forward mode and a reverse mode in a transmission reverser completes, according to one embodiment. In other embodiments, one or more of these steps or operations may be omitted, repeated, or re-ordered and still achieve the desired results.

Figure 8:
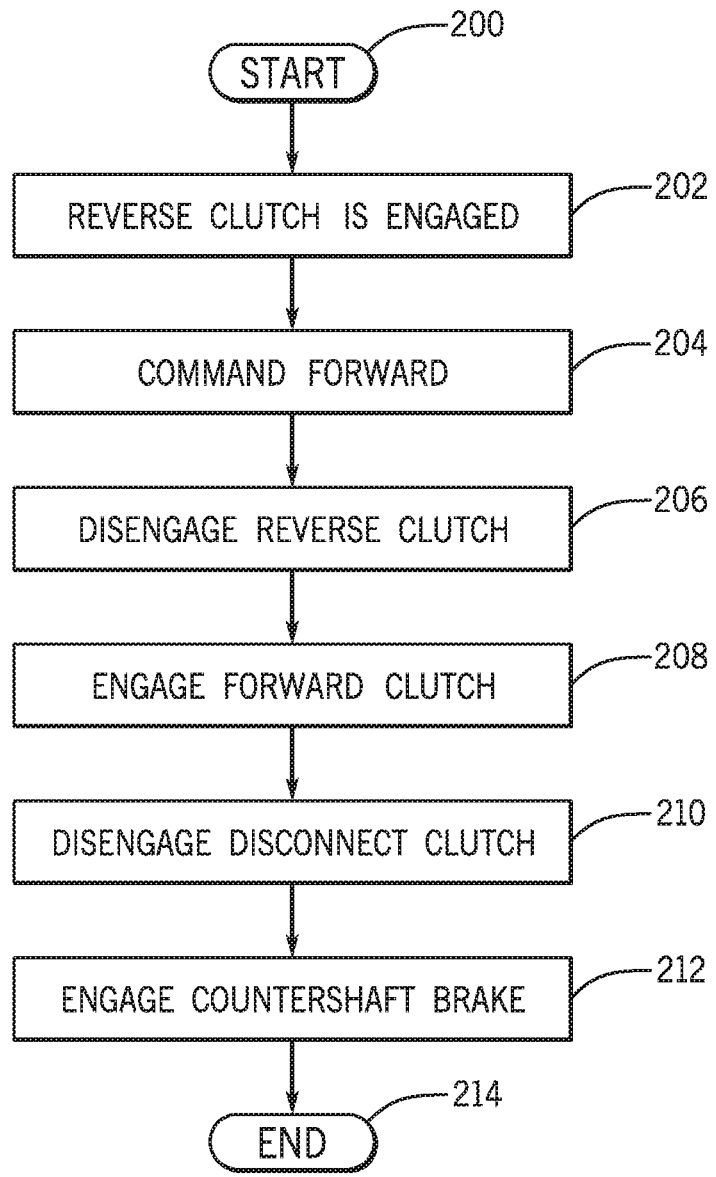
FIG. 8 is a flow diagram illustrating a method of shifting between reverse and forward directions in a transmission reverser, according to one embodiment.

FIG. 8 illustrates a flow chart for a method of shifting between a reverse mode and a forward mode in a transmission reverser, according to one embodiment, which may be implemented in one or more of the embodiments described herein and depicted in the various FIGURES. At step 200, the method starts.

At step 202, the transmission is in the reverse mode R with the reverse clutch 132 and the disconnect clutch 134 in the engaged conditions.

At step 204, the transmission receives a command to switch from the reverse mode R to the forward mode F.

At step 206, the reverse clutch 132 disengages which disconnects the second reverse gear 126 from the counter shaft 116, or disconnects the first reverse gear 120 from the output shaft 112, allowing the counter shaft 116 to rotate independently of the output shaft 112.

At step 208, the forward clutch 130 engages which releasably connects or couples the output gear 122 to the output shaft 112 causing the output gear 122 to rotate with the output shaft 112.

At step 210, the disconnect clutch 134 disengages which disconnects the third reverse gear 128 from the counter shaft 116 allowing the counter shaft 116 to rotate independently of the output gear 122.

At step 212, the countershaft brake 136 engages which slows or stops the rotation of the counter shaft 116. In some embodiments, the countershaft brake 136 can then impede or prevent the counter shaft 116 from rotating.

At step 214, the method of shifting between a reverse mode and a forward mode in a transmission reverser completes, according to one embodiment. In other embodiments, one or more of these steps or operations may be omitted, repeated, or re-ordered and still achieve the desired results.

At step 214, the method of shifting between a reverse mode and a forward mode in a transmission reverser completes, according to one embodiment. In other embodiments, one or more of these steps or operations may be omitted, repeated, or re-ordered and still achieve the desired results.

Another example embodiment of the transmission reverser disclosed herein will now be described. It will be understood that this embodiment of the transmission reverser may be incorporated into a transmission for a vehicle or work machine (or other equipment). For example, the transmission 100 may incorporate this embodiment of the transmission reverser and may have the same configuration as shown and described with respect to FIGS. 1 and 2 above, unless specifically noted, including a housing 102 forming an interior, which provides an enclosure for one or more transmission components including, but not limited to, shafts, gears, clutches, and synchronizers. As in the prior example embodiment, this embodiment of the transmission reverser may be used to shift the transmission output between forward and reverse, and may be integral with or separate from the transmission 100.

Figure 9:
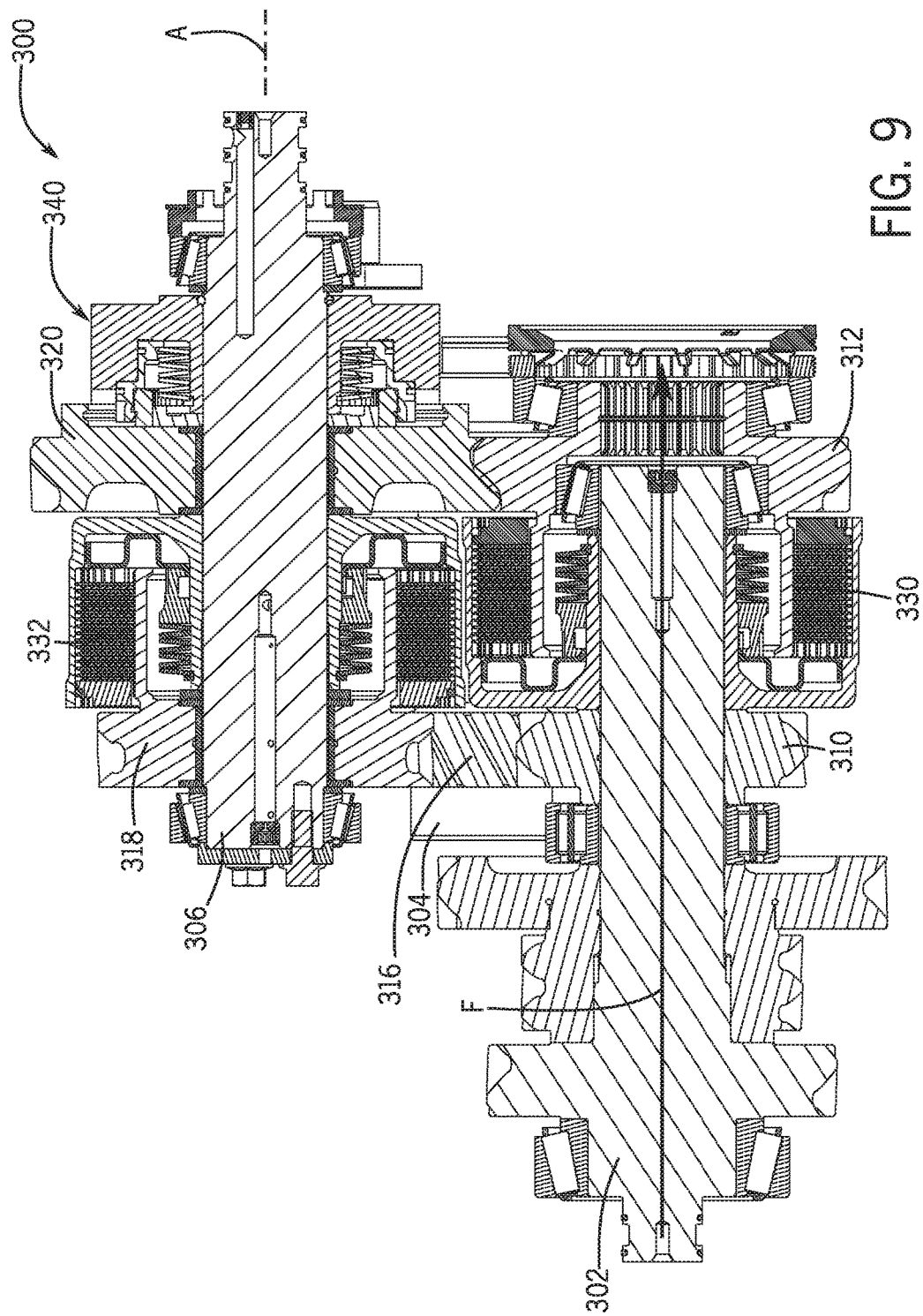
FIG. 9 is a side sectional view of a reverser illustrating the power path for the forward mode, according to a second example embodiment.
Figure 10:
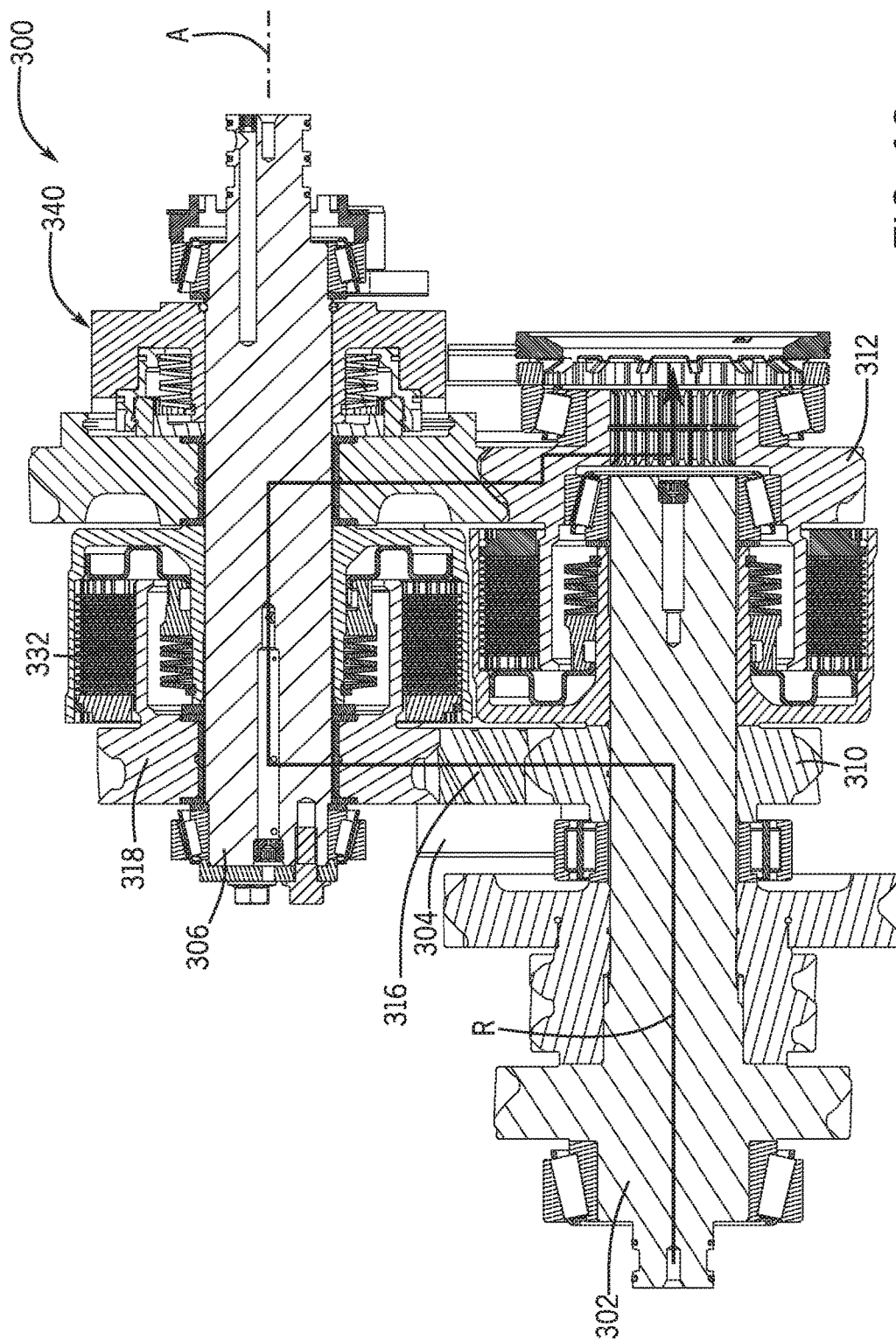
FIG. 10 a side sectional view of a reverser illustrating the power path for the reverse mode, according to the second example embodiment.

FIGS. 9 and 10 illustrate a reverser apparatus 300, which may include one or more of the following components, including an output shaft 302, an idler shaft 304, and a reverse shaft in the form of a counter shaft 306 extending along a rotation axis "A," all of which are rotatably connected to the transmission housing 102. The transmission 100 or the reverser apparatus 300 may include a first reverse gear 310 and an output gear 312 positioned or mounted on the output shaft 302. The output gear 312 may be operatively connected to the drivetrain of a vehicle providing power to ground engaging apparatus such as wheels or tracks. The transmission 100 or the reverser apparatus 300 may include an idler gear 316 positioned or mounted on the idler shaft 304, and a second reverse gear 318 and a third reverse gear 320 positioned or mounted on the counter shaft 306. The transmission 100 or the reverser apparatus 300 may include a forward clutch 330, which operably connects or couples the output gear 312 with the output shaft 302 in an engaged position or condition. The forward clutch 330 may be connected to or mounted about the output shaft 302. The transmission 100 or the reverser apparatus 300 may include a reverse clutch 332, which operably connects or couples the second reverse gear 318 with the counter shaft 306 in an engaged position or condition. Like the preceding embodiment, in this embodiment, the reverse clutch 332 may be connected to or mounted about the counter shaft 306, such that the counter shaft 306 rotates independently of the first reverse gear 310, the idler gear 316, and idler shaft 304 when the reverse clutch 332 is disengaged. In another embodiment, the reverse clutch 332 operably connects or couples the first reverse gear 310 with the output shaft 302, in which case the reverse clutch 332 may be connected to or mounted about the output shaft 302, such that the output shaft 302 rotates independently of the first reverse gear 310, the idler gear 316, and idler shaft 304 when the reverse clutch 332 is disengaged.

The transmission 100 or the reverser apparatus 300 of this embodiment includes a disconnect synchronizer 340, which operably connects or couples the third reverse gear 320 with the counter shaft 306 in an engaged position or condition. The disconnect synchronizer 340 may be connected to or mounted about the counter shaft 306. The first reverse gear 310 engages or meshes with the idler gear 316, which engages or meshes with the second reverse gear 318. The third reverse gear 320 engages or meshes with the output gear 312. In this embodiment, the transmission 100 or the reverser apparatus 300 may omit a countershaft brake used in the preceding embodiment to reduce or stop the rotation of the counter shaft 306 in an engaged position or condition, and thereby impede or prevent the reverse clutch 332 from rotating. Alternatively, a countershaft brake may be incorporated in the transmission 100 or the reverser apparatus 300 of this embodiment, such as countershaft brake 136, and may be used for the noted purpose.

FIG. 9 illustrates a power path or flow for a forward mode F through the reverser apparatus 300. In the forward mode F, the forward clutch 330 is engaged causing the output gear 312 to rotate with the output shaft 302, and the reverse clutch 332 (and at times the disconnect synchronizer 340) are disengaged. (If present, the countershaft brake may be engaged impeding or preventing the counter shaft 306 and the reverse clutch 332 from rotating.) The idler shaft 304 rotates opposite to the output shaft 302 based upon the ratio of the first reverse gear 310 to the idler gear 316. The second reverse gear 318 rotates about the counter shaft 306 in a direction opposite of the idler shaft 304 based upon the ratio of the idler gear 316 to the second reverse gear 318. At slow forward speeds, the disconnect synchronizer 340 can be engaged causing the counter shaft 306 to rotate in the opposite direction as the output shaft 302 based upon the ratio of the output gear 312 to the third reverse gear 320. (If present, the countershaft brake would be disengaged.) As with the preceding embodiment, slow forward speeds may be at or below about 5 kph, 4 kph, 3 kph, 2 kph, or 1 kph.

FIG. 10 illustrates a power path or flow for a reverse mode R through the reverser apparatus 300. In the reverse mode R, the reverse clutch 332 and the disconnect synchronizer 340 are engaged causing the output gear 312 to rotate in a direction opposite the output shaft 302. The forward clutch 330 (and if present, the countershaft brake) are disengaged. The output gear 312 rotates opposite to the counter shaft 306 based upon the ratio of the third reverse gear 320 to the output gear 312. The counter shaft 306 rotates opposite to the idler shaft 304 based upon the ratio of the idler gear 316 to the second reverse gear 318. The idler shaft 304 rotates opposite the output shaft 302 based upon the ratio of the first reverse gear 310 to the idler gear 316. As a result, the counter shaft 306 rotates in the same direction as the output shaft 302.

The disconnect synchronizer may be configured in various ways. For example, certain known synchronizers are engaged and disengaged by movement of a shift rail and fork arrangement, which may be manually or semi-automatically actuated. Generally, in such cases, one or more fork elements ride along one or more shift rails to displace a synchronizer element into engagement with a gear of the transmission (e.g., by meshing synchronizer splines with gear splines). The synchronizer is coupled for co-rotation with the shaft, and thus, the engagement of the synchronizer with the gear also couples the gear to the shaft for co-rotation, thereby incorporating the gear into the rotational power (or torque) path from the power source (e.g., an engine). A blocking member may be arranged between the synchronizer element and the gear to inhibit displacement until its splines are clocked to offset with the splines of the gear. The engagement and disengagement of the gear may thus be largely, if not entirely, mechanical in the sense that the shift rail actuates the synchronizer back and forth with respect to the gear. Certain other known synchronizers have been devised that use hydraulic power to couple transmission gears to the output shaft. Some of these use a shift rail and fork assembly similar to that described above, although shift fork movement is effected hydraulically. Other systems eliminate the shift rail and fork arrangement entirely. Instead, these systems route hydraulic fluid into chambers that drive pistons to displace shift collars into engagement with the gears. A shift collar is disengaged from a gear by venting a pressure chamber so that one or more return springs acting on the piston can move the shift collar back to a neutral position. The reverse may be true as well in which the spring applies the engaging force to the shift collar, which is then disengaged hydraulically. Still other synchronizers may be used that are fully electro-hydraulically operated such that displacement of the shift collars into both engagement and disengagement positions is accomplished by hydraulic power. Moreover, the disconnect synchronizer may be single- or double-sided, in which either one or two gears may be selectively engaged with the shaft.

By way of example, this embodiment of the reverser apparatus 300 will be described with the disconnect synchronizer 340 being configured as a single-sided (or "half") forkless synchronizer that is hydraulically engaged and disengaged by spring force. Although not shown, it will be understood that the work vehicle, transmission 100 or the reverser apparatus 300 includes, or is in operational communication with, an electrohydraulic system with one or more hydraulic pumps and electrohydraulic valves operated by one or more controllers to control operational modes of the transmission 100 or reverser apparatus 300. Generally, the example disconnect synchronizer 340 is operable to selectively couple the third reverse gear 320 to the counter shaft 306, and thereby the reverse clutch 332 to the output gear 312, depending on the control logic associated with the operational mode of the transmission, as noted above and described in detail below.

FIG. 10A illustrates the example half forkless hydraulic disconnect synchronizer 340. The disconnect synchronizer 340 may be connected to or mounted about the counter shaft 306 by a drum 342 or the like that is mounted to the counter shaft 306 for co-rotation at all times, such as via the mating splines or other mating toothed or multi-sided sections of the counter shaft 306 and the drum 342. The drum 342 defines a stepped annular piston chamber 344 in which hydraulic fluid may be directed in a controlled manner to move an actuator piston 346 along the rotation axis A. The actuator piston 346 has a stepped outer periphery to match the piston chamber 344 and is sealed (via O-rings or the like) at both stepped diameters. The shift collar 348 has an axially splined inner diameter that mates with an axially splined periphery (circumference or circumferential segments) of a hub 350 that has an axially splined inner diameter engaging splines on the counter shaft 306. The hub 350 has open areas in which mount spring detent arrangements 352 (each with a spring 354, a ball 356 and a ball collar 358) that are coupled to the hub 350 (e.g., by retaining pins of or attached to the ball collar 358). The balls 356 of the spring detent arrangements 352 ride in an annular groove 368 in the splined inner diameter of the shift collar 348 and apply a spring force to a blocking ring 370 when the shift collar 348 is initially shifted axially relative to the hub 350. An annular body of the blocking ring 370 is disposed within an annular, open-faced pocket 372 in the hub 350 axially between the third reverse gear 320 and the hub 350. The blocking ring 370 rotates with the hub 350 but is permitted to "float" or rotate relative to the hub 350 slightly, for example, through a pin and slot connection (not shown) of the blocking ring 370 to the hub 350. The blocking ring 370 has a tapered inner periphery that mates with a tapered annulus or cone 374 that may be attached to or integrally formed with the third reverse gear 320. In certain embodiments, the taper of the blocking ring 370 or the gear cone 374 may include (e.g., by adhesive bonding) a thin friction ring 360 to aid in establishing a robust frictional connection, and cooling grooves (not shown) may be formed into the friction ring 360 to aid in heat dissipation. The blocking ring 370 also has an axially splined outer ring (or ring segments) that engages with the splined inner diameter of the shift collar 348. The drum 342, the actuator piston 346, the shift collar 348, the hub 350 and the blocking ring 370 may each be an assembly of parts or a single, monolithic structure. Movement of the actuator piston 346 is biased against by one or more springs 380 (e.g., Belleville springs) that are mounted within the drum 342 axially between the actuator piston 346 and the hub 350.

The blocking ring 370 functions to reduce or prevent "gear clash" by blocking the splines of the shift collar 348 from engaging the splines of the third reverse gear 320 when the projections of the splines of the shift collar 348 are not clocked or rotationally aligned with the valleys of the splines of the third reverse gear 320. Specifically, as the shift collar 348 is moved axially toward the third reverse gear 320 by the actuator piston 346, the groove 368 in the splined inner diameter of the shift collar 348 will cam against the balls 356 to compress the springs 354, and thereby apply an axial force against a radial face of the blocking ring 370. The axial force is an axial component of the radial force applied to the springs 354 by engagement of the balls 356 and curved wall of the groove 368. The springs 354 push the blocking ring 370 against the third reverse gear 320, more specifically, the tapered surface of the blocking ring 370 and the gear cone 374. Initially there will be a differential between the rotational speed of the blocking ring 370 (and thus the rest of the disconnect synchronizer 340 and the counter shaft 306) and the third reverse gear 320. The spring force biasing the blocking ring 370 against the third reverse gear 320 along with the speed differential creates torque on the blocking ring 370, which causes it to rotate relative to the hub 350 slightly (e.g., until the pin(s) meet the end(s) of the slot(s)), after which it continues to co-rotate with the hub 350. This positions the blocking ring 370 in a position that interferes with the axial path of the shift collar 348. As the shift collar 348 continues to travel, tapered tooth points at the ends of the splines of the shift collar 348 contact tapered tooth points of the splines of the blocking ring 370. The angled tips cam against each other and create rotational force or torque on the blocking ring 370 tending to index and clear the blocking ring 370 from the path of the splines of the shift collar 348. This torque is resisted by torque from the engagement of the blocking ring 370 (or friction ring 360) and the gear cone 374, which is still rotating at a different speed. Upon the third reverse gear 320 being accelerated or decelerated to match the disconnect synchronizer 300 speed, the frictional torque with the gear cone 374 dissipates to allow the splines of the shift collar 348 to pass between the splines of the blocking ring 370. If the third reverse gear 320 is not properly clocked with the blocking ring 370, as the shift collar 348 travels further, tooth point contact between the shift collar 348 and the third reverse gear 320 will create torque that indexes the blocking ring 370 slightly (as permitted by the pin and slot connection(s)) until the splines of the shift collar 348 can fully engage with the splines of the third reverse gear 320. The splines of the shift collar 348 will mate with the splines of both the third reverse gear 320 and the hub 350 simultaneously, thereby engaging the third reverse gear 320 with the counter shaft 306. When the pressure in the piston chamber 344 is vented sufficiently, the springs 380 will return the actuator piston 346 and the shift collar 348 to the disengaged position in which the third reverse gear 320 is disengaged from the counter shaft 306.

FIG. 10B illustrates that the actuator piston 346 directly engages the shift collar 348 along an interlock interface formed between an interlock features 388, 389 in annular surfaces 390, 391 of the actuator piston 346 and the shift collar 348. The shift collar 348 is connected to the actuator piston 346 by overlapping radial surfaces 392, 393 of the interlock features 388, 389 when the annular surfaces 390, 391 are arranged concentrically. Coupling the interlock features 388, 389 may connect the shift collar 348 to the actuator piston 346 with relative rotational freedom, such as to allow for an angular indexing (e.g., 2-3 degrees) of the shift collar 348 relative to the actuator piston 346 by providing a small (e.g., half of a millimeter) difference in the radial dimensions. The radial surfaces 392, 393 of the interlock features 388, 389 engage to prevent separation of the shift collar 348 from the actuator piston 346 in at least one axial direction, such as during return to the disengaged position. The radial surfaces 392, 393 of the interlock features 388, 389 may be oriented substantially perpendicular to the rotation axis A of the counter shaft 306 to provide a flat surface and sharp corner for establishing and maintaining contact between the actuator piston 346 and the shift collar 348 during retraction. Also, the annular surfaces 390, 391 of the actuator piston 346 and the shift collar 348 may include undercut stress-relieving recesses 394, 395 adjacent the radial surfaces 392, 393 of the interlock features 388, 389. In various embodiments, the actuator piston 346 and the shift collar 348 may be the same or different materials and manufactured using the same or different processes. For example, the shift collar 348 may be heat treated carbonized steel, and the actuator piston 346 may be a quenched and tempered forged steel with no heat treatment. Further, the actuator piston 346 and the shift collar 348 may be assembled directly to one another without fasteners or other intermediary components, such as by a press-fit operation to engage the interlock features 388, 389. As one example, the actuator piston 346 may be pressed onto the shift collar 348, in which case the inner annular surface 390 of the actuator piston 346 overlaps and engages the outer annular surface 391 of the shift collar 348. The actuator piston 346 and the shift collar 348 may each include chamfered leading edges 396, 397 (which convert axial forces to radial forces to open the actuator piston 346), and the actuator piston 346 may include one or more peripheral notches 398 at the chamfered leading edge 396 of its annular surface 390 to facilitate flexing and relieve stress during the press-fit operation below material yield. It will be understood that other configurations are possible and that the overlap and coupling of components may be reversed from that described.

Figure 11:
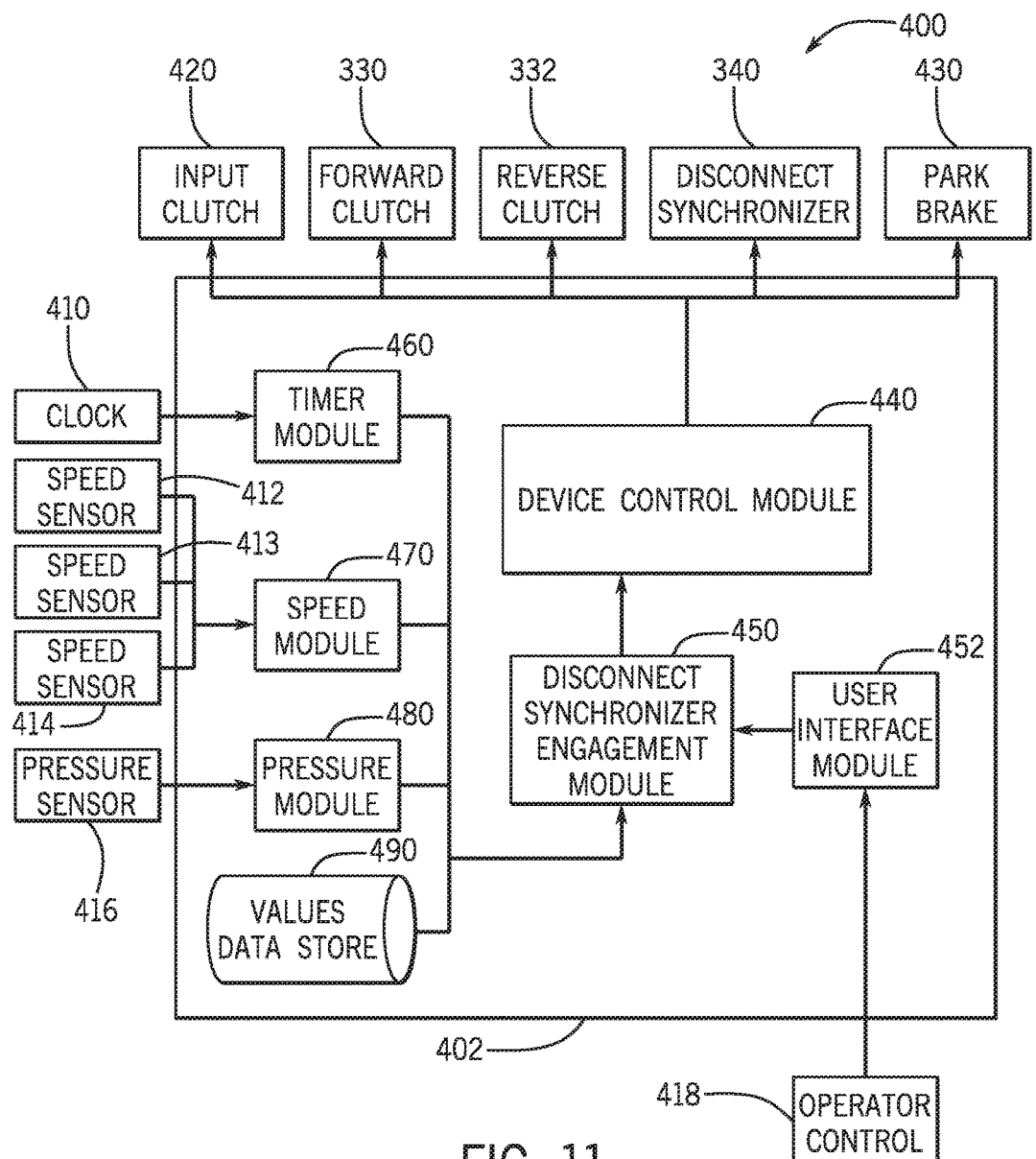
FIG. 11 is a schematic diagram of a control system for a transmission according to the second example embodiment.
Figure 11A:
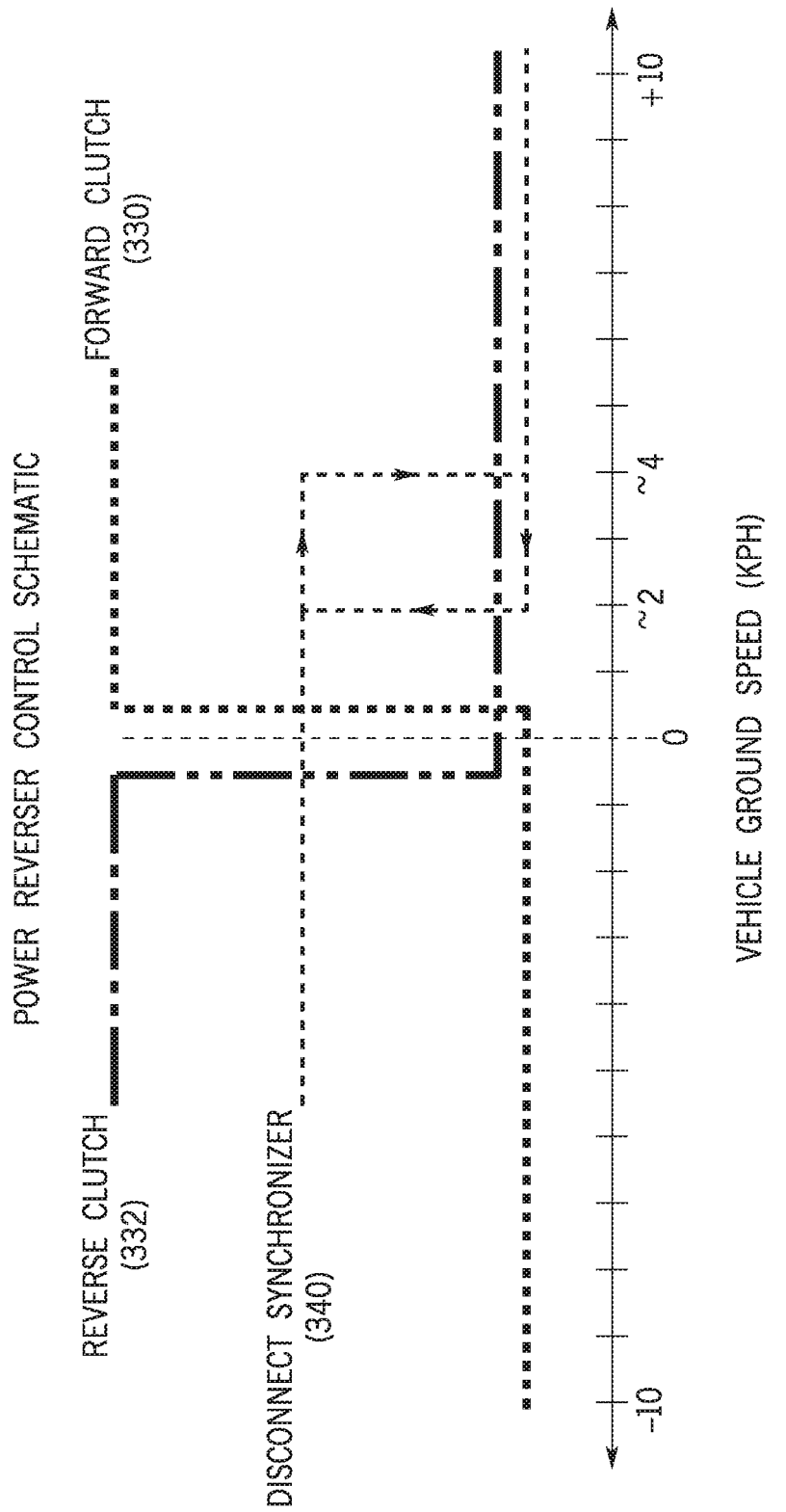
FIG. 11A is a schematic diagram of a control strategy for a transmission, according to the second embodiment.

FIG. 11 illustrates schematically control hardware and data flow for a transmission, which may be implemented with regard to the embodiment of the reverser apparatus 300. FIG. 11A illustrates a control strategy for a control system 400 of FIG. 11. When the transmission 100 is in the reverse mode R, the reverse clutch 332 and the disconnect synchronizer 340 are engaged and the forward clutch 330 (and countershaft brake if present) are disengaged. Generally, when switching between the reverse mode R and the forward mode F, events can occur in the following order: the reverse clutch 332 is disengaged, the forward clutch 330 is engaged, the disconnect synchronizer 340 is disengaged (and if present, the countershaft brake is engaged). The reverse clutch 332 and the forward clutch 330 can be engaged and disengaged at slow reverse speeds, slow forward speeds, or when the vehicle is not moving. When the transmission is in the forward mode F, the forward clutch 330 (and countershaft brake if present) are engaged and the reverse clutch 332 (and at times the disconnect synchronizer 340) are disengaged. Generally, when switching between the forward mode F and the reverse mode R, events can occur in the following order: any countershaft brake is disengaged, the disconnect synchronizer 340 is engaged, the forward clutch 330 is disengaged, and the reverse clutch 332 is engaged. The disconnect synchronizer 340 (and the countershaft brake if present) can be engaged and disengaged at slow forward speeds or when the vehicle is not moving.

The control system 400 includes a vehicle, transmission or reverser apparatus controller 402 (or multiple controllers) that may be configured as a computing device with associated processor devices and memory architectures, as a hard-wired computing circuit (or circuits), as a programmable circuit, as a hydraulic, electrical or electro-hydraulic controller, or otherwise, so as to execute various computational and control functionality with respect to the transmission 100 or the reverser apparatus 300. The controller 402 and its various modules are each schematically represented by a single block. However, the controller 402, and its modules, can include any number of processing devices, which can be distributed and interconnected utilizing different communication protocols and memory architectures. Also, each block depicted may incorporate one or more additional components than that specified (e.g., a block representing a particular clutch or synchronizer may include an associated electrohydraulic control valve). As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

The controller 402 may be configured to receive input signals in various formats (e.g., as hydraulic signals, voltage signals, current signals, and so on), and to output command signals in various formats (e.g., as hydraulic signals, voltage signals, current signals, mechanical movements, and so on). The controller 402 may be in electronic, hydraulic, mechanical, or other communication with various other systems or devices of the vehicle, transmission or reverser apparatus. For example, the work vehicle controller 402 may be in electronic or hydraulic communication with various actuators, sensors, and other devices within (or outside of) vehicle, transmission or reverser apparatus, including various timers or clocks 410 and various sensors, such as speed sensors 412, 413, 414 and a pressure sensor 416 for determining the absolute or relative speeds or pressures of various components of the reverser apparatus 300 (e.g., the speed of the third reverse gear 320 with respect to the counter shaft 306 or various disconnect synchronizer components co-rotating therewith), and an operator control 418. Various other devices and sensors (e.g., temperature sensors) may be incorporated into the control system 400 and used by the controller 402 to process the disclosed control logic. The various devices and sensors provide input or observe conditions associated with the transmission 100 or the reverser apparatus 300 and generate input signals or data that are communicated to the controller 402. The controller 402 may be located onboard the vehicle, or at various remote locations. The controller 402 uses input from the various devices and sensors to control the state of engagement of various components of the transmission 100 or the reverser apparatus 300, including an input clutch 420, the forward clutch 330, the reverse clutch 332, the disconnect synchronizer 340, and a park brake or park mode control 430. The input clutch 420 may be one or a combination of multiple clutches interposed between the engine and the output shaft 302 to control power from the engine in one of various operational modes of the transmission 100. Various other devices (e.g., a countershaft brake) may be controlled by the control system 400.

In the illustrated embodiment, the controller 402 includes various embedded modules or sub-modules that unitarily or collectively process the input signals or data and provide output control commands to the devices of the transmission 100 or reverser apparatus 300 according to the control logic of the present disclosure. As may be appreciated, in other embodiments, the modules or sub-modules shown may be combined and/or further partitioned. Specifically, the example controller 402 includes a device control (DC) module 440 that interfaces with the various components and devices of the transmission 100 or reverser apparatus 300, namely, for example, the input clutch 420, the forward clutch 330, the reverse clutch 332, the disconnect synchronizer 340 and the park brake or control 430. The DC module 440 communicates with a disconnect synchronizer engagement (DSE) module 450, which in turn communicates with one or more of a timer module 460, a speed module 470, a pressure module 480 and a values data store 490. The DSE module 450 also communicates with a user interface (UI) module 452, which receives input from the operator control 418. As illustrated, the timer module 460 receives input data from the clock 410, the speed module 470 receives sensor input data from the speed sensors 412, 413, 414, and the pressure module receives sensor input data from the pressure sensor 416. The values data store 490 is a memory storage module containing various stored values used by the controller 402 through one or more of its modules to execute control logic according to one or more actual or sensed parameters. The values data store 490 may include one or more speed, pressure, time or other threshold values which the controller 402 may evaluate with respect to actual or sensed parameters according to stored control logic, which may be stored in the various modules or sub-modules, or other onboard or remote memory modules. Example control logic executed by the controller 402 with respect to the transmission 100 or the reverser apparatus 300 will now be described.

Figure 12:
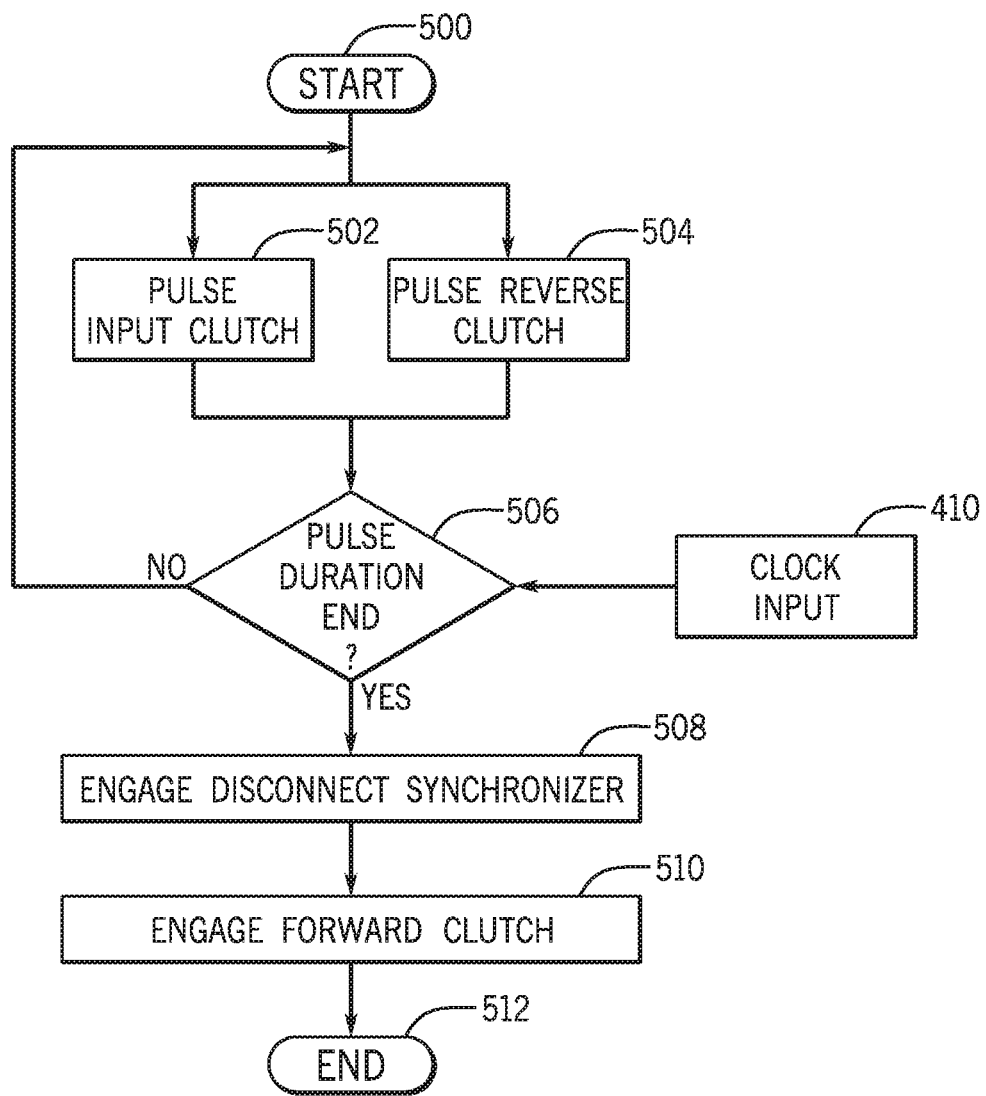
FIG. 12 is a flow diagram illustrating an example start-up sequence for a transmission reverser, according to the second embodiment.

FIG. 12 illustrates a flow chart for control logic by which the control system 400 implements a method of executing a start-up mode or sequence for the transmission 100 or the reverser apparatus 300, according to one embodiment. Generally, the start-up sequence applies power to the disconnect synchronizer 340 and thereby torque to its engagement-effecting components (e.g., shift collar, blocking ring) to facilitate engagement with the third reverse gear 320. It should be noted that the example method and control logic depicted with respect to FIG. 12, and any of the other various FIGURES, may be applicable to one or more other embodiments described herein.

The start-up sequence begins at step 500 in which the park brake or control 430 is engaged and all clutches (i.e., the input clutch 420, the forward clutch 330, the reverse clutch 332, etc.) are disengaged prior to or during initial start-up the vehicle. At steps 502 and 504, the controller 402, via the DC module 440, energizes or pulses the input clutch 420 and the reverse clutch 332 to engage such that power (i.e., rotational force or torque) from the power source is applied, simultaneously or near simultaneously, to both the output shaft 302 and the counter shaft 306. At step 506, the controller 402, via the timer module 460, queries whether the input clutch 420 and the reverse clutch 332 are disengaged by evaluating input from the clock 410 and a stored pulse duration value or range of values from the values data store 490. In alternative embodiments, rather than using clock input, this determination may be made by the controller 402 using temperature input data from temperature sensors at the input clutch 420 and the reverse clutch 332 and stored temperature threshold value or range of values correlated to indicate the engagement period of the clutches. In either case, depending on the determination made by the controller 402, the control logic reverts to steps 502 and 504 to continue energizing the input clutch 420 and the reverse clutch 332, or if the pulse duration has expired, the method continues to step 508, at which the controller 402, via the DC module 440, commands the disconnect synchronizer 340 to engage. At step 510, the controller 402, again via the DC module, commands the forward clutch 330 to engage. At step 512, the start-up sequence of the transmission 100 or reverser apparatus 300 completes, according to one embodiment. In other embodiments, one or more of these steps or operations may be omitted, repeated, or re-ordered and still achieve the desired results.

Figure 13:
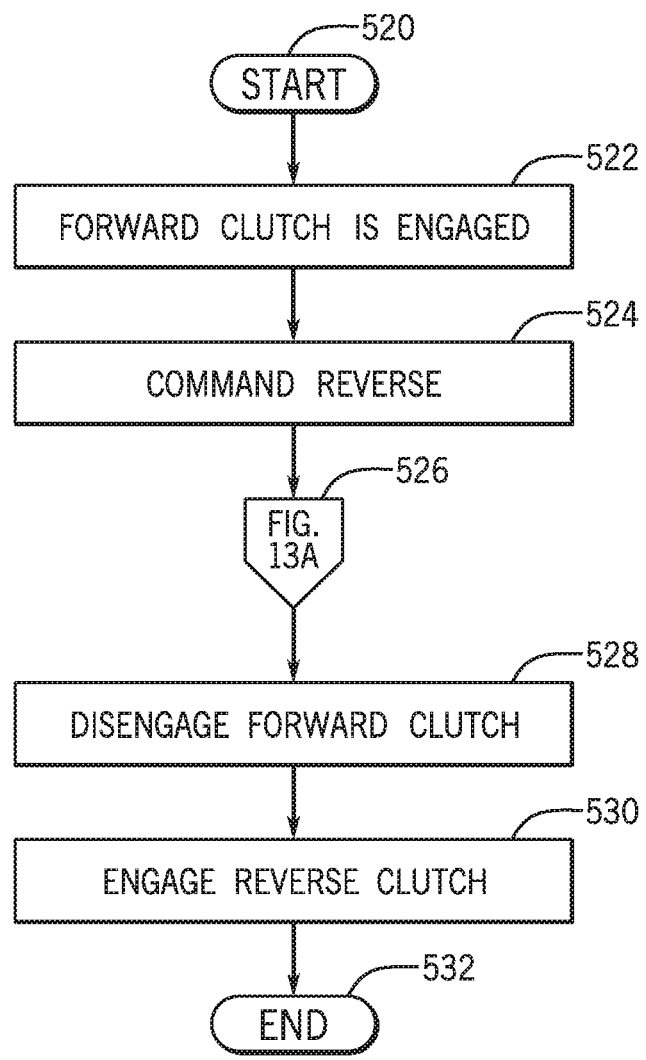
FIG. 13 is a flow diagram illustrating an example method of shifting between forward and reverse directions in a transmission reverser, according to the second embodiment.

FIG. 13 illustrates a flow chart including control logic by which the control system 400 implements a method of shifting between a forward mode and a reverse mode in the transmission 100 or the reverser apparatus 300, according to one embodiment. At step 520, the method starts, and at step 522, the controller 402, via the DC module 440, has previously commanded the forward clutch 330 to engage, such that the transmission 100 is in the forward mode F. (At step 522, the controller 402 may also engage a countershaft brake if present.) At step 524, the controller 402 receives a reverse command, via the UI module 452 and the operator control 418, and commands, via the DC module 440, the transmission 100 or the reverser apparatus 300 to switch from the forward mode F to the reverse mode R. (The controller 402 would command, via the DC module 440, a countershaft brake, if present, to disengage, which allows the counter shaft 306 to rotate.) At step 526, the control logic proceeds to the sub-routine illustrated in FIG. 13A to engage the disconnect synchronizer 340, according to one embodiment, which is detailed in the following paragraphs. With the disconnect synchronizer 340 engaged, at step 528, the controller 402, via the DC module 440, commands the forward clutch 330 to disengage which disconnects the output gear 312 from the output shaft 302, allowing the output gear 312 to rotate independently of the output shaft 302, and in which case, the counter shaft 306 rotates in the opposite direction as the output shaft 302. At step 530, the controller 402, via the DC module 440, commands the reverse clutch 332 to engage which releasably connects the second reverse gear 318 to the counter shaft 306. This causes the counter shaft 306 to rotate in the same direction as the output shaft 302 based upon the engagement of the first reverse gear 310 mounted on the output shaft 302 with the idler gear 316 mounted on the idler shaft 304 and the engagement of the idler gear 316 with the second reverse gear 318. At step 532, the method of shifting between a forward mode and a reverse mode in a transmission reverser completes, according to one embodiment. In other embodiments, one or more of these steps or operations may be omitted, repeated, or re-ordered and still achieve the desired results.

Figure 13A:
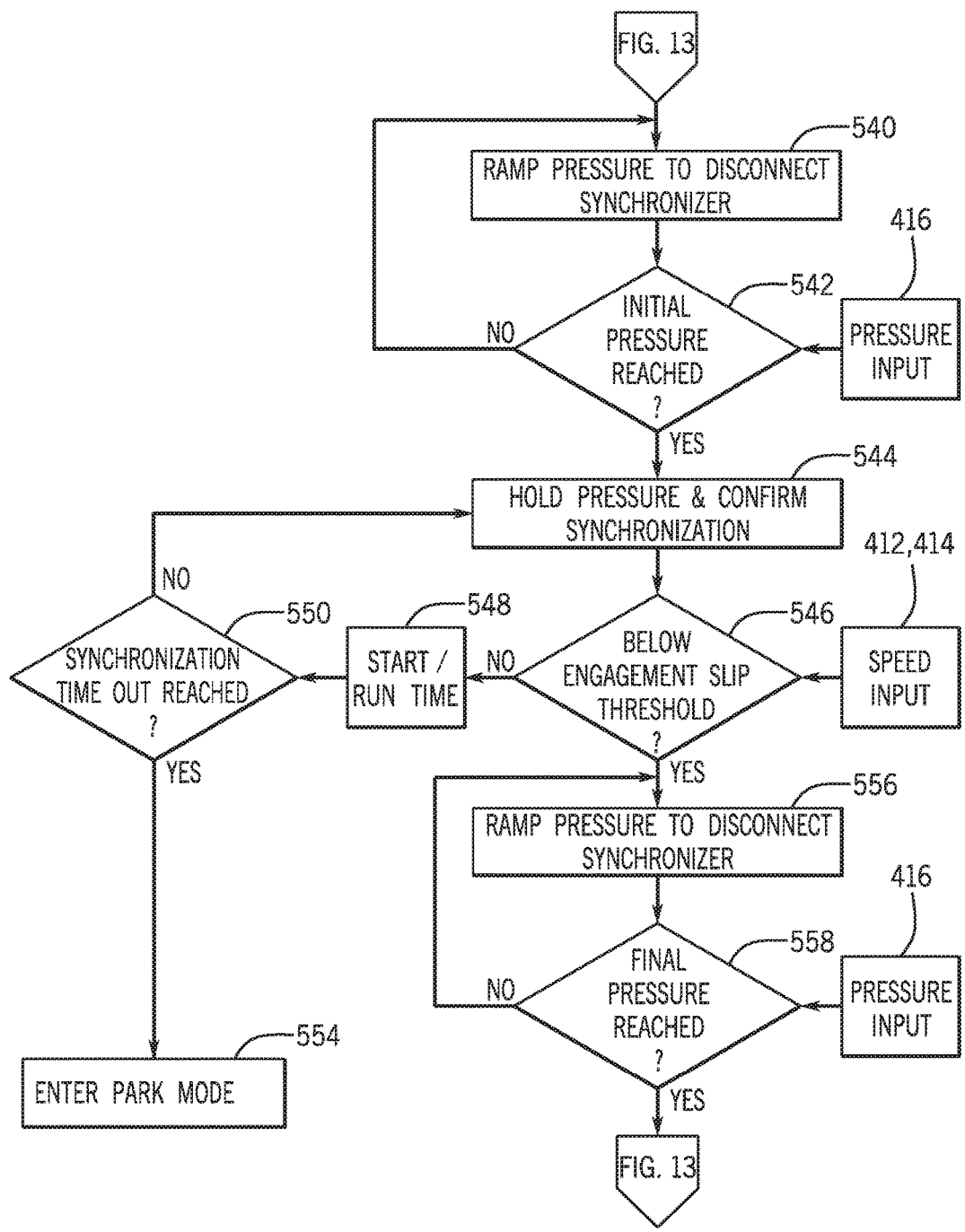
FIG. 13A is a flow diagram illustrating an example logic subroutine for controlling engagement of a disconnect synchronizer in the method of FIG. 13.

FIG. 13A illustrates a flow chart for a subroutine to engage the disconnect synchronizer 340, according to one embodiment. Generally, the illustrated control logic controls engagement of the disconnect synchronizer 340 to releasably connect the third reverse gear 320 to the counter shaft 306, and thereby control engagement of the third reverse gear 320 with the output gear 312 in a controlled manner that may reduce the occurs of gear clash or other wear on the disconnect synchronizer 340, and the reverser apparatus 300 and the transmission 100 overall.

At step 540, the subroutine begins by the controller 402, via the DC module 440 and the DSE module 450, commanding pressure to the disconnect synchronizer 340. The commanded pressure is limited to an initial pressure value or range of pressure values stored in the values data store 490 less than the maximum pressure or other operational pressure value of the system. The controller 402 may command the full initial pressure immediately. However, in the illustrated example, the controller 402, via the DC module 440 and the DSE module 450 as informed by the pressure module 480 and the values data store 490, commands the pressure to ramp up in a linear (or possibly non-linear) manner over a prescribed initial ramp time period (which may be a value or range of time or counter values stored in the values data store 490). At step 542, the controller 402, via the DSE module 450 as informed by the timer module 460, the pressure module 480, which receives input from the pressure sensor 416, and the values data store 490, queries whether the initial pressure has been reached. If not, the control logic reverts to step 540 and continues to increase pressure to the disconnect synchronizer 340 until the initial pressure value is reached.

At step 544, upon reaching the initial pressure value, the controller 402 commands the pressure to the disconnect synchronizer 340 to hold at the initial pressure value to confirm synchronization of the disconnect synchronizer 340. To accomplish this, at step 546, the controller 402, via the DSE module 450 as informed by the speed module 470, the speed sensors 412, 414, and the values data store 490, queries whether an engagement slip threshold has been met. The engagement slip threshold may be a stored value or range of slip values or other values (e.g., rotational speed values or ranges) that indicate engagement of the disconnect synchronizer 340, such as rotational speeds or one or more differential speeds across the disconnect synchronizer 340.

The controller 402, via the DSE module 450 as informed by the speed module 470 and the values data store 490, may resolve the slip across the disconnect synchronizer 340 by evaluating speed input signals from the speed sensors 412, 414. By way of example, the speed sensor 412 may sense the rotational speed of the third reverse gear 320 and the speed sensor 414 may sense the rotational speed of the drum 342. In other embodiments, the speed sensors 412, 414 may sense other components that rotate relative to one another at some point during operation of the disconnect synchronizer 340 (e.g., the counter shaft 306 or the hub 350 and the shift collar 348).

If the slip corresponding to the sensed rotational speed differential across the disconnect synchronizer 340 is higher than the stored slip threshold value, then the controller 402 continues to hold pressure to the disconnect synchronizer 340 at the initial pressure as it attempts to confirm that synchronization has been completed. Specifically, in the example subroutine illustrated, at step 548, the controller 402, via the timer module 460 (and clock 410), initiates a timer or counter of the elapsed time period since a synchronization attempt has been commenced, for example, the elapsed time beginning when, or when the controller 402 determined that, the disconnect synchronizer 340 reached the initial pressure. At step 550, the controller 402, via the DSE module 450 as informed by the timer module 460 (and clock 410) and the values data store 490, queries whether a stored prescribed time period allotted for synchronization has expired. If the controller 402 determines step 550 to be true (i.e., synchronization timed out), then the control logic flows to step 554 at which the controller 402, via the DC module 440, commands the park brake or mode 430 to engage (and otherwise cause the transmission or vehicle to enter a park mode). If step 550 is false, then the control logic reverts to step 544 after which the controller 402 again checks for synchronization (i.e., engagement) of the disconnect synchronizer 340.

When engaged, at step 556, the controller 402, via the DC module 440, commands a final pressure to the disconnect synchronizer 340. The commanded pressure may be a maximum or other higher operational pressure value or range of pressure values that may be stored in the values data store 490. The controller 402 may command the full final pressure immediately. However, in the illustrated example, the controller 402, via the DC module 440 and the DSE module 450 as informed by the pressure module 480 and the values data store 490, commands the pressure to ramp up in a linear (or possibly non-linear) manner over a prescribed final ramp time period (which may be a value or range of time or counter values stored in the values data store 490). At step 558, the controller 402, via the DSE module 450 as informed by the timer module 460, the pressure module 480 (and the pressure sensor 416), and the values data store 490, queries whether the final pressure has been reached. If not, the control logic reverts to step 556 and continues to increase pressure to the disconnect synchronizer 340 until the initial pressure value is reached. When the final pressure has been reached, then the subroutine completes, and the above-described method continues at step 528 of FIG. 13.

Figure 14:
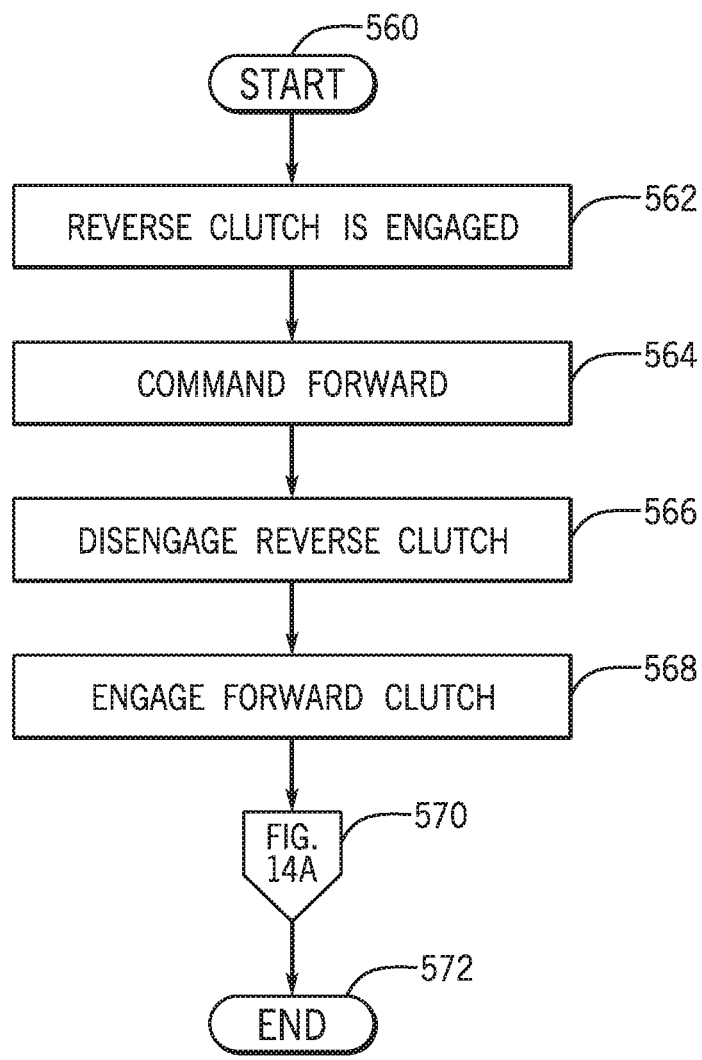
FIG. 14 is a flow diagram illustrating an example method of shifting between reverse and forward directions in a transmission reverser, according to the second embodiment.

FIG. 14 illustrates a flow chart including control logic by which the control system 400 implements a method of shifting between a reverse mode and a forward mode in the transmission 100 or the reverser apparatus 300, according to one embodiment. At step 560, the method starts, and at step 562, the controller 402, via the DC module 440, has previously commanded the reverse clutch 332 and the disconnect synchronizer 340 to engage, such that the transmission 100 is in the reverse mode R. At step 564, the controller 402 receives a forward command, via the UI module 452 and the operator control 418, and commands, via the DC module 440, the transmission 100 or the reverser apparatus 300 to switch from the reverse mode R to the forward mode F. At step 566, the controller 402, via the DC module 440, commands the reverse clutch 332 to disengage which disconnects the second reverse gear 318 from the counter shaft 306 (or disconnects the first reverse gear 310 from the output shaft 302 in an alternate embodiment) allowing the counter shaft 306 to rotate independently of the output shaft 302. At step 568, the controller 402, via the DC module 440, commands the forward clutch 330 to engage which releasably connects the output gear 312 to the output shaft 302 causing the output gear 312 to rotate with the output shaft 302. This causes the counter shaft 306 to rotate in the same direction as the output shaft 302 based upon the engagement of the first reverse gear 310 mounted on the output shaft 302 with the idler gear 316 mounted on the idler shaft 304 and the engagement of the idler gear 316 with the second reverse gear 318. At step 570, the control logic proceeds to the sub-routine illustrated in FIGS. 14A and 14B, according to one embodiment, which is detailed in the following paragraphs. At step 572, the method of shifting between a reverse mode and a forward mode in a transmission reverser completes, according to one embodiment. In other embodiments, one or more of these steps or operations may be omitted, repeated, or re-ordered and still achieve the desired results, for example, the controller 402 may command a counter-shaft brake (if present) to engage to slow or stop rotation of the counter shaft 306 at certain times when in the forward mode F.

Figure 14A:
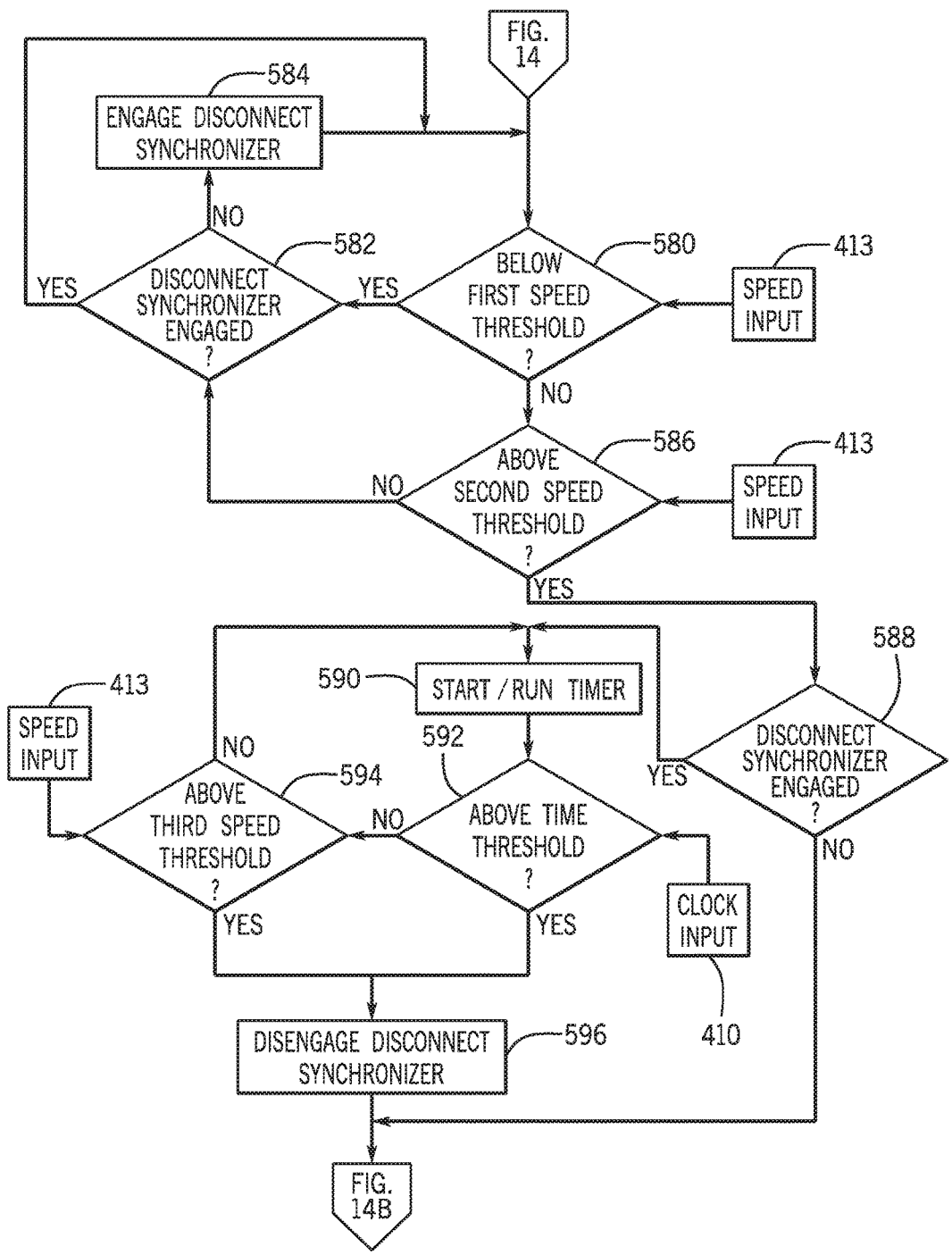
FIG. 14A is a flow diagram illustrating an example control logic subroutine for controlling engagement or disengagement of the disconnect synchronizer in the method of FIG. 14.

FIG. 14A illustrates a flow chart for a subroutine to resolve engagement or disengagement of the disconnect synchronizer 340, according to one embodiment. Generally, the illustrated control logic controls engagement and disengagement of the disconnect synchronizer 340 to releasably connect the third reverse gear 320 to the counter shaft 306, and thereby control engagement of the third reverse gear 320 with the output gear 312. The illustrated control logic further provides for efficient operation of the transmission or vehicle by intelligently managing the state of engagement of the disconnect synchronizer 340, for example, to engage the disconnect synchronizer 340 at certain operational conditions to achieve rapid forward/reverse shifting within little or no lag, and disengaging the disconnect synchronizer 340 at other operational conditions to reduce wear and power consumption associated with its engagement.

At step 540, the subroutine begins by the controller 402, via the DSE module 450 as informed by the speed module 470, querying whether the transmission 100 or the reverser apparatus is operating below a prescribed first speed threshold, which may be a stored speed value or range of values stored in the values data store 490. It should be understood that the prescribed speed threshold may correspond to one or more rotational or linear speeds associated with the transmission 100 or the reverser apparatus 300, or a vehicle in which they are incorporated. Thus, the speed may be determined by the speed module 470 receiving sensed speed signals from various rotational or linear speed sensing devices, including the speed sensors 412, 413, 414, which may sense the speeds of various components of the transmission 100 or the reverser apparatus 300 or other components of a vehicle in which they are incorporated, as well as a vehicle ground speed device (e.g., a speedometer and the like). In any case, the sensed speed and the stored speed thresholds may be, or may be processed by the controller 402 or other controllers, to correlate to a ground speed value. For example, the control logic in the illustrated subroutine may be useful in managing the state of engagement of the disconnect synchronizer 340 with respect to one or more ground speed values (e.g., relatively low ground speed values such as <5 kph) and thus the following description of the example control logic will thus be understood in at least such a context. Further, since ground speed can be sensed or correlated using a single sensor (e.g., sensor 413 configured to sense the speed of the output gear 312) will be referenced below and in FIG. 14A.

If the controller 402 determines that the speed is below the first speed threshold, then the control logic dictates engagement of the disconnect synchronizer 340, and effects this, at step 582, by first querying whether the disconnect synchronizer 340 is currently engaged. If not, at step 584, the controller 402, via the DC module 440 and the DSE module, commands engagement of the disconnect synchronizer 340, and otherwise reverts to step 580 to again query the speed. This continues until step 580 is false, and thus specifies that the method of FIG. 14 will control the vehicle in the forward mode F to maintain engagement of the disconnect synchronizer 340 at low speeds (e.g., <3 kph). This readies, and effectively preselects, the reverser arrangement 300 to shift into the reverse mode R, without requiring a period of zero power during the shift transition, since engagement of the disconnect synchronizer 340 happens while out of the power flow of the transmission 100 or the reverser apparatus 300.

At step 586, upon surpassing the first speed threshold, the controller 402, via the speed module 470 and the values data store 490, queries the speed with respect to a stored prescribed second speed threshold that is, or corresponds to, a higher speed value or range of values than the first speed threshold. It should be noted that the controller 402 evaluates the second speed threshold at least in part to accommodate hysteresis in the sensed speed signals such that the second speed threshold may be close in magnitude to (e.g., 4 kph), and provide an upper bound for, the first speed threshold. In fact, in alternate embodiments of the control logic for applications with low or negligible hysteresis or which do not account for hysteresis, the second speed threshold may be omitted. In any event, if the speed is below the second speed threshold the control logic reverts to 582 where the state of the disconnect synchronizer 340 is queried and the speed is reassessed with respect to the first and second speed thresholds.

At step 588, with the speed above the second speed threshold, the controller 402 again queries the state of engagement of the disconnect synchronizer 340. If the disconnect synchronizer is engaged, at step 590, the controller 402 initiates a timer or counter via the timer module 460 (and clock 410), of the elapsed time period above the second speed threshold. At step 592, the controller 402, via the DSE module 450 as informed by the timer module 460 (and clock 410) and the values data store 490, queries whether a stored prescribed time period (e.g., 30 seconds) allotted for engagement of the disconnect synchronizer 340 above the second speed threshold has expired. If not, at step 594, in a similar manner as in steps 580 and 586 (i.e., by comparing sensed speed with stored speed threshold values), the controller 402 queries whether the speed is above a prescribed third speed threshold stored in the values data store 490 as an associated value or range of values. The third speed threshold is higher than the second threshold and may correspond to a higher speed (e.g., 20 kph) operation of the vehicle in the forward mode F. If less than the third speed threshold, the control logic reverts to step 590 at which the timer continues to run and the controller 402 again checks time and speed thresholds. If the controller 402 determines step 588 to be false, or either of steps 592 or 594 to be true (i.e., above either the time or speed thresholds), then the control logic flows to step 596 at which the controller 402, via the DC module 440 and the DSE module 450, commands the disconnect synchronizer 340 to disengage. This subroutine completes and the method of FIG. 14 continues with the subroutine illustrated in FIG. 14B.

Figure 14B:
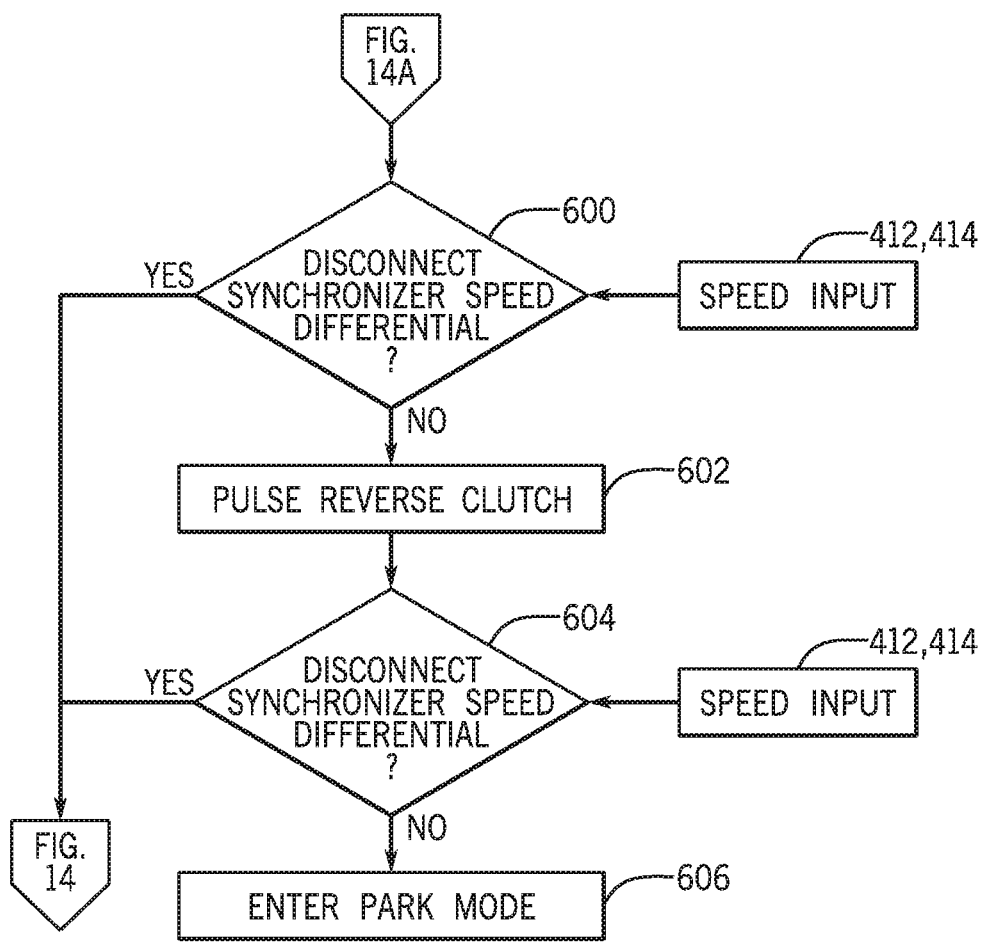
FIG. 14B is a flow diagram illustrating an example control logic subroutine for detecting a fault in disengagement of the disconnect synchronizer in the method of FIG. 14.

FIG. 14B illustrates a flow chart for a subroutine to determine the presence of a disengagement fault at the disconnect synchronizer 340, according to one embodiment. At step 600, the controller 402, via the DSE module 450 as informed by the speed module 470, the speed sensors 412, 414, and the values data store 490, queries whether there is a speed differential (or slip) across the disconnect synchronizer 340. This may be done by evaluating the sensed speed signals from the speed sensors 412, 414 with respect to each other, or by comparing them to a speed threshold differential or slip threshold value or range of values in the values data store 490. As previously described, to determine a speed differential across the disconnect synchronizer 340, the speed sensor 412 may sense the rotational speed of the third reverse gear 320 and the speed sensor 414 may sense the rotational speed of the drum 342. In other embodiments, the speed sensors 412, 414 may sense other components that rotate relative to one another at some point during operation of the disconnect synchronizer 340 (e.g., the counter shaft 306 or the hub 350 and the shift collar 348).

If no speed differential is determined at step 600, at step 602, the controller 402, via the DC module 440 and the DSE module 450, momentarily energizes or pulses the reverse clutch 332, which momentarily applies power to the disconnect synchronizer 340 via the counter shaft 306 (momentarily four-squaring the transmission) to very briefly apply torque to disengage certain components (e.g., shift collar and gear cone) that may have been maintained in engagement inadvertently. At step 604, the controller 402 again checks for a differential speed across the disconnect synchronizer 340 in the same manner as step 600. If due to the pulsing at step 602 or for other reasons, a speed differential exists and disengagement is confirmed, then the subroutine completes and returns to step 572 in the method of FIG. 14, at which the method of shifting between a reverse mode and a forward mode in a transmission reverser completes, according to one embodiment. If not, the controller, via the DC module 440, commands engagement of the park brake or mode 430.

It will be appreciated that when the disconnect synchronizer 340 is disengaged the counter shaft 306, and thereby the reverse clutch 332, is disconnected from the output gear 312. In this condition, differential speed across the disengaged reverse clutch 332 that would have existed without this disconnection is eliminated, along with associated wear from the various effects of windage, gyroscopic flutter and other drag that may arise between the relatively rotating elements of the disengaged reverse clutch 332. Avoiding such effects, which may be particularly deleterious should the transmission be operated beyond certain maximum design parameters (e.g., when the vehicle is operated at excessive speeds by gravity), improves the operational life of the reverse clutch 332, and thus the transmission 100 and the reverser apparatus 300 overall.

The control logic of the illustrated subroutines has been described with respect to the methods of FIGS. 13 and 14 with the subroutine of FIG. 13A being described with respect to a reverse mode R and the subroutines of FIGS.

14A and 14B being described with respect to a forward mode F. It will be understood that the subroutines may be implemented in transmissions or reverser apparatuses operating in different modes or according to other methods or control logic.

Without in any way limiting the scope, interpretation, or application of the claims appearing below, a technical effect of one or more of the example embodiments disclosed herein is a double disconnect transmission reverser for changing the direction of a vehicle between forward and reverse. Another technical effect of one or more of the example embodiments disclosed herein is a transmission reverser which reduces windage or friction in a disengaged reverse clutch. Another technical effect of one or more of the example embodiments disclosed herein is a transmission reverser which reduces the possibility of gyroscopic flutter in the disengaged reverse clutch due to lower rotational speeds. Another technical effect of one or more of the example embodiments disclosed herein is a transmission reverser which can impede or prevent counter rotation of the reverse clutch during high forward speeds of the vehicle.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "having," "including," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A control system for a transmission reverser having an output gear, a forward disconnect device, a first reverse disconnect device, and a second reverse disconnect device, the control system comprising:
a controller with a processing unit and a memory unit configured to execute control logic to control the transmission reverser in a forward mode and a reverse mode; and
sensors for determining a speed of one or more components of the transmission reverser indicative of a vehicle speed associated with the transmission reverser and for determining an elapsed time period associated with a shifting operation, the sensors providing to the controller a speed input associated with the determined speed and a clock input associated with the determined time period;
wherein, in the forward mode, the controller commands the first reverse disconnect device to disengage and the forward disconnect device to engage to rotate the output gear in a forward direction;
wherein, in the reverse mode, the controller commands the first reverse disconnect device to engage and the second reverse disconnect device to engage to rotate the output gear in a reverse direction; and
wherein, in the forward mode, the controller commands the second reverse disconnect device to either engage to connect the first reverse disconnect device to the output gear or disengage to disconnect the first reverse disconnect device from the output gear, at least in part, based upon the speed input being above or below a speed threshold and the clock input being above or below a time threshold.

2. The control system of claim 1, wherein, in the forward mode, the controller commands the second reverse disconnect device to engage when the speed input is below a first speed threshold.

3. The control system of claim 2, wherein, in the forward mode, the controller commands the second reverse disconnect device to disengage when the speed input is above a second speed threshold.

4. The control system of claim 3, wherein, in the forward mode, the controller commands the second reverse disconnect device to engage when the speed input is above the first speed threshold and when the clock input is below the time threshold and to disengage when the clock input is above the time threshold; and
wherein the time threshold is a continuous elapsed time period above the first speed threshold.

5. The control system of claim 1, wherein the first reverse disconnect device is a reverse clutch and the second reverse disconnect device is a reverse disconnect synchronizer.

6. The control system of claim 5, wherein the sensors determine a speed differential across the reverse disconnect synchronizer and provide a speed differential input to the controller.

7. The control system of claim 6, wherein, in the reverse mode, the controller:
commands a first pressure to the reverse disconnect synchronizer;
evaluates the speed differential input relative to a slip threshold; and
commands a second pressure higher than the first pressure to the reverse disconnect synchronizer when the speed differential input is below the slip threshold.

8. The control system of claim 6, wherein the controller commands the transmission reverser into a park mode when the speed differential input is above a slip threshold and the clock input is above the time threshold.

9. The control system of claim 6, wherein, in the forward mode, the controller:
commands the reverse disconnect synchronizer to disengage;
evaluates the speed differential input relative to a slip threshold; and
commands the reverse clutch to engage momentarily if the speed differential input is below the slip threshold.

10. The control system of claim 9, wherein, in the forward mode and following momentary engagement of the reverse clutch, the controller:
evaluates an updated speed differential input from the sensors relative to the slip threshold; and
commands the transmission reverser into a park mode if the updated speed differential input is below the slip threshold.

11. A control system for a transmission reverser having an output shaft, an output gear, a reverse gear, a forward clutch, a reverse clutch, and a reverse disconnect synchronizer, the control system comprising:
- one or more controllers having processing and memory architecture configured to execute control logic to control the transmission reverser in a forward mode and a reverse mode;
- one or more speed sensors for determining a speed of one or more components of the transmission reverser indicative of a vehicle speed associated with the transmission reverser, the one or more speed sensors providing a speed input to the one or more controllers; and
- one or more timers for determining an elapsed time period associated with a shifting operation and providing a clock input to the one or more controllers;
- wherein, in the forward mode, the one or more controllers:
  - command the reverse clutch to disengage;
  - command the forward clutch to engage to connect to the output gear to the output shaft such that the output gear rotates in a direction of rotation of the output shaft;
  - receive and analyze the speed input and the clock input; and
  - command the reverse disconnect synchronizer to engage or disengage at least in part, based upon the speed input being above or below a speed threshold and the clock input being above or below a time threshold such that the reverse clutch is either connected to the output gear or disconnected from the output gear; and
- wherein, in the reverse mode, the one or more controllers command the reverse clutch and the reverse disconnect synchronizer to engage such that the reverse shaft rotates the output gear in a reverse direction of rotation opposite the direction of rotation of the output shaft.

12. The control system of claim 11, wherein, in the forward mode, the one or more controllers:
- command the reverse disconnect synchronizer to engage when below a first speed threshold;
- command the reverse disconnect synchronizer to disengage when above a second speed threshold; and
- command the reverse disconnect synchronizer to engage when above the first speed threshold and below the time threshold and to disengage when above the time threshold.

13. The control system of claim 11, wherein the one or more speed sensors determine a speed differential across the reverse disconnect synchronizer and provide a speed differential input to the controller; and
- wherein, in the forward mode, the one or more controllers:
  - command a first pressure to the reverse disconnect synchronizer;
  - evaluate the speed differential input relative to a slip threshold; and
  - determine an elapsed time when at the reverse disconnect synchronizer is above the first pressure and the speed differential input is above the slip threshold;
  - command a second pressure higher than the first pressure to the reverse disconnect synchronizer when the speed differential input is below the slip threshold; and
  - command the transmission reverser into a park mode when the speed differential input is above the slip threshold and the elapsed time is above the time threshold.

14. The control system of claim 11, wherein, in the forward mode, the one or more controllers:
- command the reverse disconnect synchronizer to disengage;
- evaluate the speed differential input relative to a slip threshold; and
- command the reverse clutch to engage momentarily if the speed differential input is below the slip threshold.

15. The control system of claim 14, wherein, in the forward mode and following momentary engagement of the reverse clutch, the one or more controllers:
- evaluate an updated speed differential input relative to the slip threshold; and
- command the transmission reverser into a park mode if the updated speed differential input is below the slip threshold.

* * * * *